(12) United States Patent
Rivaud et al.

(10) Patent No.: US 11,506,845 B2
(45) Date of Patent: Nov. 22, 2022

(54) PROTECTION ELEMENTS USED FOR SHIPPING OPTICAL NETWORKING EQUIPMENT

(71) Applicant: Ciena Corporation, Hanover, MD (US)

(72) Inventors: Daniel Rivaud, Ottawa (CA); Fabien Colton, Kars (CA); Simon J. Shearman, Almonte (CA); Lloyd Cosman, Stittsville (CA)

(73) Assignee: Ciena Corporation, Hanover, MD (US)

(*) Notice: Subject to any disclaimer, the term of this patent is extended or adjusted under 35 U.S.C. 154(b) by 86 days.

(21) Appl. No.: 17/079,602

(22) Filed: Oct. 26, 2020

(65) Prior Publication Data
US 2022/0128772 A1    Apr. 28, 2022

(51) Int. Cl.
*G02B 6/38* (2006.01)

(52) U.S. Cl.
CPC ......... *G02B 6/3849* (2013.01); *G02B 6/3887* (2013.01); *G02B 6/3893* (2013.01); *G02B 6/3897* (2013.01)

(58) Field of Classification Search
CPC .. G02B 6/3887; G02B 6/3893; G02B 6/3849; G02B 6/38
USPC .......................................................... 385/78
See application file for complete search history.

(56) References Cited

U.S. PATENT DOCUMENTS

| 6,154,867 | A | 11/2000 | Itoi et al. |
| 6,376,779 | B1 | 4/2002 | Shearman et al. |
| 6,426,876 | B1 | 7/2002 | Shearman et al. |
| 6,466,724 | B1 | 8/2002 | Glover et al. |
| 6,512,679 | B1 | 1/2003 | Shearman et al. |
| 6,545,850 | B1 | 4/2003 | Shearman et al. |
| 6,948,968 | B1 | 9/2005 | Shearman et al. |
| 6,980,725 | B1 * | 12/2005 | Swieconek .......... G02B 6/4452 385/135 |
| 7,037,143 | B2 | 5/2006 | Aziz et al. |
| 7,043,130 | B2 | 5/2006 | Ng et al. |
| 7,123,807 | B2 | 10/2006 | Ng et al. |
| 7,145,773 | B2 | 12/2006 | Shearman et al. |
| 9,492,914 | B2 | 11/2016 | Ng et al. |
| 9,603,289 | B1 | 3/2017 | Shearman et al. |
| 9,769,959 | B2 | 9/2017 | Mayenburg et al. |

(Continued)

FOREIGN PATENT DOCUMENTS

| AU | 2010311180 A1 * | 6/2012 | ............. H01R 24/60 |
| AU | 2014101551 A4 * | 9/2015 | ............ G02B 6/3897 |

*Primary Examiner* — Kaveh C Kianni
(74) *Attorney, Agent, or Firm* — Clements Bernard Baratta; Lawrence A. Baratta, Jr.; Christopher L. Bernard

(57) ABSTRACT

Protection elements are provided for protecting optical networking systems during shipment. In one implementation, a system includes a card having one or more sockets, each socket having a connector device. The system also includes a pluggable module having an interface configured to connect with the connector device of a respective socket when the pluggable module is fully seated in the socket. A first protection element is configured to be held in place near a front edge of the socket. The first protection element is configured to allow the pluggable module to be arranged in a partially inserted position within the socket. Also, the first protection element is further configured to block the pluggable module from being fully seated in the socket to thereby prevent the interface of the pluggable module from contacting the connector device of the socket.

17 Claims, 19 Drawing Sheets

(56) References Cited

U.S. PATENT DOCUMENTS

| | | |
|---|---|---|
| 9,820,403 B2 | 11/2017 | Shearman et al. |
| 10,104,799 B2 | 10/2018 | Shearman et al. |
| 10,440,852 B1 | 10/2019 | Shearman et al. |
| 10,674,241 B2 | 6/2020 | Rivaud et al. |
| 10,729,037 B1 | 7/2020 | Shearman et al. |
| 10,736,227 B1 | 8/2020 | Rivaud et al. |
| 2003/0184974 A1 | 10/2003 | Atkinson et al. |
| 2005/0047074 A1 | 3/2005 | Shearman |
| 2005/0074990 A1 | 4/2005 | Shearman et al. |
| 2005/0075001 A1 | 4/2005 | Shearman et al. |
| 2007/0114056 A9 | 5/2007 | Cosman et al. |
| 2018/0003910 A1* | 1/2018 | Menguy ............... G02B 6/3825 |
| 2018/0081137 A1 | 3/2018 | Rivaud et al. |
| 2019/0327126 A1 | 10/2019 | Rivaud et al. |
| 2019/0327188 A1 | 10/2019 | Rivaud et al. |

* cited by examiner

PROTECTION ELEMENTS USED FOR SHIPPING OPTICAL NETWORKING EQUIPMENT

TECHNICAL FIELD

The present disclosure generally relates to optical networking systems. More particularly, the present disclosure relates to elements for protecting network equipment during shipment of the network equipment to a field location, e.g., a data center, central office, customer premises, etc.

BACKGROUND

Networking equipment used in an optical system is manufactured in a factory and then run through a number of tests at the factory to ensure that all the various parts are working properly and are compatible with each other. After testing, the equipment can be shipped to a site (e.g., data center or other location) where the equipment will be installed and used. This networking equipment may include physical components (e.g., shelves, cabinets, racks, chassis, etc.) for physically supporting optical and/or electrical devices (e.g., modules, line cards, cards, circuit packs, plug receptacle cages, pluggable modules, fiber optic cables, etc.). Normally, each individual component of the networking equipment is shipped separately from the other components in its own box or container. Then, the equipment can be set up at the site, which may include connecting various components together, and then the equipment can be put online for use.

However, the processes of setting up all the equipment and attaching the components together in the correct way can be complex and time-consuming. Typically, an expert may be required to travel to the site in order to set up the equipment, which may be an expensive service for the customer. Some customers on site may be able to set the equipment, but this may require a great amount of effort, cost, and installation time. Also, an inexperienced installer may easily make mistakes during installation, which would require extra time and effort to troubleshoot any set up errors.

Normally, the equipment is packaged and shipped in multiple boxes and containers to protect each of the component during the shipping process. For example, if one component (e.g., a pluggable module) were to be inserted into a socket of another component (e.g., a circuit pack) such that the connectors of the two components were engaged, the pins and contacts of these connectors could easily be damaged by the vibrations that would normally be experienced during shipment. To avoid excessive wear to these connectors, the normal procedure for shipping the network equipment includes keeping the components separated from each other.

There is a need in the field of networking systems to provide systems and methods that overcome the above-mentioned issues with the conventional shipping procedures. For example, there is a need to provide protection for the networking equipment during the shipping process while also simplifying the installation process on site.

BRIEF SUMMARY

The present disclosure protection systems, methods, and devices for protecting an optical networking system during a shipping process. According to one implementation of the present disclosure, an optical networking system includes a card having one or more sockets, each of the one or more sockets including a connector device. the optical networking system further includes one or more pluggable modules, each pluggable module including an interface configured to connect with the connector device of a respective socket when the pluggable module is fully seated in the respective socket. Also, the optical networking system includes a first protection element configured to be held in place near a front edge of the one or more sockets. The first protection element may be configured to allow the one or more pluggable modules to be arranged in a partially inserted position within the one or more respective sockets. Also, the first protection element is further configured to block the one or more pluggable modules from being fully seated in the one or more sockets to thereby prevent the interface of each of the one or more pluggable modules from contacting the connector device of the respective socket.

According to another implementation, the present disclosure may be directed to a protection apparatus configured to protect an optical networking system during a shipping process. The protection apparatus may include a first protection element configured to be held in place near a front edge of one or more sockets of a card, where each of the one or more sockets may include a connector device. The first protection element may be configured to allow one or more pluggable modules to be arranged in a partially inserted position within the one or more respective sockets. Each pluggable module may include an interface configured to connect with the connector device of a respective socket when the pluggable module is fully seated in the respective socket. The first protection element is further configured to block the one or more pluggable modules from being fully seated in the one or more sockets to thereby prevent the interface of each of the one or more pluggable modules from contacting the connector device of the respective socket.

According to yet another implementation, a method for preparing an optical networking system for shipping is provided. The method may include the steps of fastening a first protection element to a face plate of a card and inserting a pluggable module into a socket on the card until a step or beveled edge of the pluggable module contacts the first protection element.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
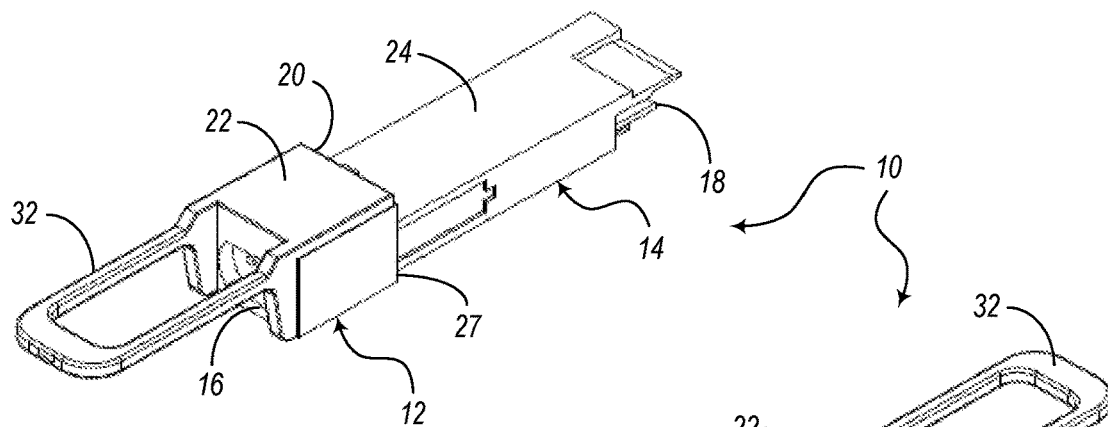
FIGS. 1 and 2 are diagrams illustrating isometric views of a pluggable module, according to various embodiments.

The present disclosure relates to protection elements for protecting networking equipment during a shipping process. According to the various embodiments, the protection elements are configured to allow the components of the networking equipment to be "partially" installed (e.g., pre-cabled). In other words, the various parts may be inserted part of the way into corresponding sockets or slid along corresponding rails, depending on the respective components being connected. Since the components are only partly inserted and not fully inserted, the corresponding connectors on one device will not be in contact with (or engaged with) the connectors on another device. For instance, a pluggable module may be inserted a certain distance into a corresponding socket of a circuit pack, but not far enough where the connector pins of the pluggable module would contact the corresponding connector pads of the circuit pack. Also, the circuit pack can be inserted as well in a shelf. In this position, the networking equipment can be shipped in the partial installation state so that the vibration and other forces that may normally be experienced during shipping will not cause the connectors to suffer from unnecessary wear.

In particular, the protection element described in the present disclosure act as a blocking element for preventing certain components of the networking equipment to be fully engaged with the corresponding contacts, connectors, sockets, or other receptable elements. While preventing full insertion, the protection elements can also be part of an overall packaging system that are configured to protect the networking equipment during shipping. Therefore, the entire packaging system can hold the components together in a way where the components will not bump against each other or cause excessive friction or stress on other components.

While the networking equipment can be shipped in this condition where the components are partially inserted and the components do not move excessively with respect to each other, the protection elements can then be easily removed at the data center or other site where the networking equipment will be housed. Once these protection elements are removed, then the components, previously prevented from full insertion during shipping, can be easily inserted fully in the corresponding receptables or spaces. Since the components have already been pre-installed partially at the factory in the correct connection patterns, the installer on site should have no difficulty completing the installation.

In a cabled-fabric system, it may be desirable to ship a pre-cabled system to simplify the set up process on site. However, one problem is that shipping pre-seated connectors may cause connector wear due to shipping vibration. For example, this can cause the gold to wear off of certain contacts and can lead to premature failure or de-graded signals. The present disclosure provides systems and methods for solving the issue of pre-cabled systems by creating customized protection elements, such as plastic frame pieces, tines, combs, etc. that act as spacers during shipment. The spacers allow the pluggable modules (e.g., Quad Small Form-factor Pluggable (QSFP) devices, Double Density QSFP (QSFP-DD) devices or any other type of pluggable module) to be inserted into their sockets or cages, but not fully seated into the corresponding connector.

An advantage of pre-cabling the optical system at the factory is that a person has access to all sides of a rack or shelf, which is often not the case on premises of a data center. According to various embodiments, a physical spacer, which is referred to in the present disclosure as a "protection element," prevents a pluggable module from being fully seated within a socket. This spacer or protection element can be installed on the optical equipment before being shipped. After shipping, the customer, user, operator, installer, or other authorized person at the data center who may be able to set up the equipment can then easily remove the protection elements and completely seat the pluggable modules in the sockets. This allows a manufacturer to ship a pre-tested and factory-cabled system to its customers who may not want to or may be unable to set up or attach the cables themselves.

Thus, the system can be constructed and cabled in the factory and then tested. After testing, instead of completely breaking down the system, the pluggable modules can be pulled out partially to a partially inserted position so that the protection elements can be installed. Thus, the same cable configuration is maintained without complete disconnection. When the complete partially inserted system shows up on site, all the cables, sockets, etc. are already matched up to simplify the completion of the set-up with proper connections. The set-up is done at the factory, such that there is no need for an installer to travel to the site to do the work of setting up. The connections can be matched in the correct way in the controlled environment.

It may be noted that this process saves on shipping boxes since all the components would not be shipped in separate containers, but the entire system may be placed in one container. This, of course, may also be better for the environment There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Protecting Pluggable Modules within Line Cards

Figure 2:
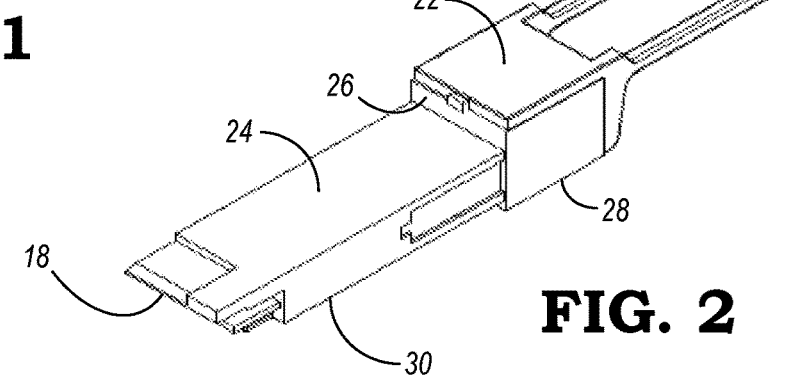

FIGS. 1 and 2 show isometric views of an embodiment of a pluggable module 10, where FIG. 1 shows a front side of the pluggable module 10 and FIG. 2 shows a back side. The pluggable module 10 may also be referred to as a pluggable optical transceiver, an optical connectivity device, etc. In this embodiment, the pluggable module 10 includes electrical and optical elements residing within a housing that includes a head 12 and an elongated body 14. Some of the electrical and optical elements may be partially exposed. For example, a front side of the head 12 of the pluggable module 10 includes an optical interface. Also, a back end of the elongated body 14 includes an electrical interface 18. In particular, the electrical interface 18 may include pins, contacts, or other electrically conductive elements that are configured to be placed into contact with connection elements of a corresponding socket. It is these connector elements of the electrical interface 18 that are to be protected during the shipment of the optical networking equipment.

The housing of the pluggable module 10 may include a first step 20 where a top surface 22 of the head 12 is above a top surface 24 of the elongated body 14. This first step 20 creates an abutment 26 on a portion of a rear-facing surface of the head 12. The abutment 26 may come into contact with an edge of a socket when the pluggable module 10 is fully inserted in the socket. Also, this abutment 26 may instead come into contact a protection element, as described in various embodiments in the present disclosure, which may be placed at this edge of the socket so that the protection element will be in between the abutment 26 and the edge of the socket to prevent the pluggable module 10 from being fully inserted in the socket. As such, the electrical interface 18 of the pluggable module 10 will not be seated within the socket so as to make electrical contact with the electrical connector elements of the socket. In some embodiments, the housing of the pluggable module 10 may include a beveled edge to provide a sloped surface from the top surface 22 of the head 12 to the top surface 24 of the elongated body 14.

Similarly, a second step 27 may be formed where a bottom surface 28 of the head 12 is below a bottom surface 30 of the elongated body 14. The second step 27 creates another abutment on a portion of the rear-facing surface of the head 12. This second abutment may also come into contact with the edge of the socket when the pluggable module 10 is fully inserted in the socket or may instead come into contact with a protection element installed at the edge of the socket. Also, the housing may be configured to include another beveled edge to provide a sloped surface from the bottom surface 28 of the head 12 to the bottom surface 30 of the elongated body 14. The pluggable module 10 may also include a handle 32 that can be used for inserting the pluggable module 10 into a corresponding socket.

The pluggable module 10 may have any suitable optical and electrical configuration and may have a housing having any suitable size or shape. Also, various types of pluggable modules may be configured to connection to various numbers of optical cables as well as electrical cables. A Small Form-factor Pluggable (SFP) is a pluggable network interface module used for both telecommunication and data communications applications. A socket on corresponding networking hardware may be configured as a modular slot for receiving the SFP device to connect a fiber optic cable. The SFP device may be configured to support Synchronous Optical Networking (SONET), Gigabit Ethernet, Fiber Channel, PON, and other communications standards and may support speeds up to 25 Gbit/s. A Quad Small Form-factor Pluggable (QSFP) is a pluggable module for supporting four lanes to enable speeds of up to four times the speed of the SFP (i.e., up to 100 Gbit/s). The pluggable module 10 may also be configured as a QSFP56 device which provides speeds up to 200 Gbit/s. Also, the pluggable module 10 may be configured as a Double Density (DD) SFP (SFP-DD) for speeds up to 100 Gbit/s over two lanes or a QSFP-DD for speeds up to 400 Gbit/s over eight lanes. Of course, the present disclosure contemplates various other types of pluggable modules, including Multi-Source Agreement (MSA)-defined modules as well as vendor proprietary implementations.

Figure 3:
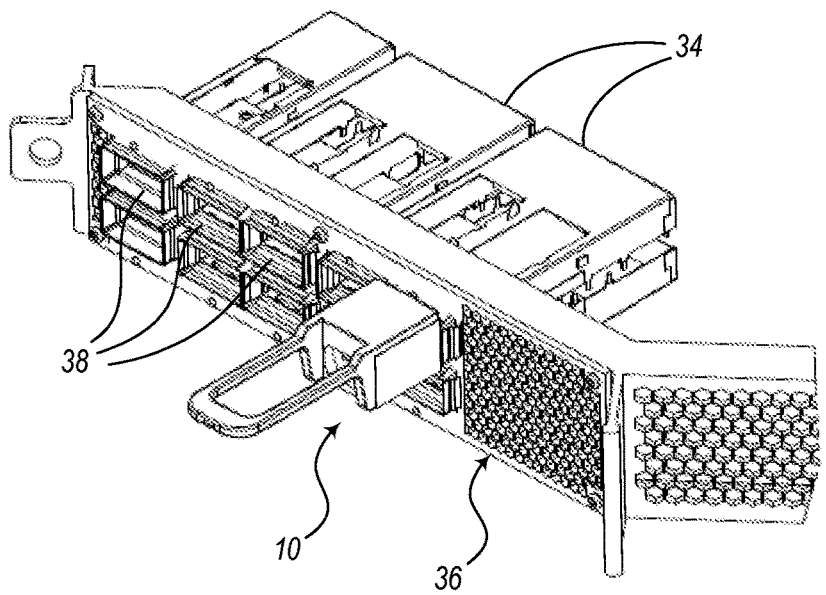
FIG. 3 is a diagram illustrating an isometric view of the pluggable module of FIGS. 1 and 2 inserted into one of a number of sockets of a circuit pack, according to various embodiments.
Figure 4:
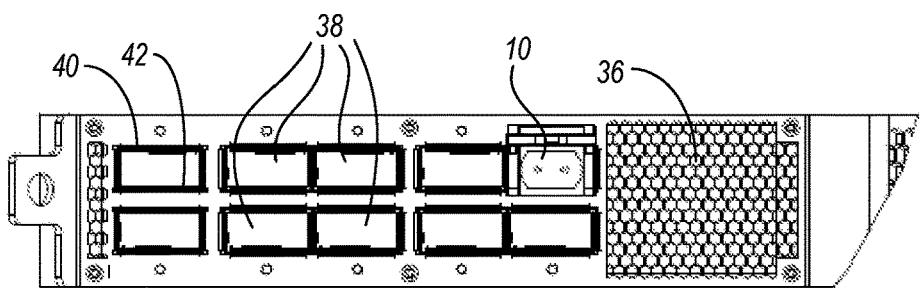
FIG. 4 is a diagram illustrating a front view of the sockets of the circuit pack shown in FIG. 3 with the pluggable module inserted into the socket, according to various embodiments.

FIG. 3 shows a portion of optical networking equipment, include one or more plug receptacle cages 34 mounted to a faceplate 36 of a shelf, cabinet, box, or other structure for supporting the optical and/or electrical components of the optical networking equipment. FIG. 4 shows a front view of the faceplate 36 and sockets 38. Also, FIGS. 3 and 4 show the pluggable module 10 inserted into one of the sockets 38 of one of the plug receptacle cages 34. The plug receptacle cages 34 may include a plurality of sockets 38 into which a plurality of pluggable modules may be inserted. A single pluggable module (e.g., pluggable module 10 of FIGS. 1 and 2) is shown in FIGS. 3 and 4 inserted into one of the sockets 38. The sockets 38 may have a top edge 40, a bottom edge 42, and side edges surrounding and/or defining an aperture into which the pluggable modules 10 may be inserted.

To plug the pluggable module 10 into the socket 38, an installer may grasp the handle 32 at the front end and insert the elongated body 14 into the aperture of the socket 38. The installer may then push the pluggable module 10 forward (e.g., using the handle 32) so that the elongated body 14 slides within the socket 38 (cages) until the electrical interface 18 is engaged with the corresponding connector elements of the plug receptacle cages 34. When fully inserted, as shown in FIG. 3, the top and bottom steps/abutments (e.g., steps 20, 27, abutment 26, etc.) of the pluggable module 10 may contact the corresponding top and bottom edges of the socket 38.

In some embodiments, the sockets 38 located on a top row may be oriented so as to accept the pluggable modules 10 in a right-side up manner. The sockets 38 located on a bottom row may be oriented in an inverted manner so as to accept the pluggable modules 10 in an upside-down manner.

Figure 5:
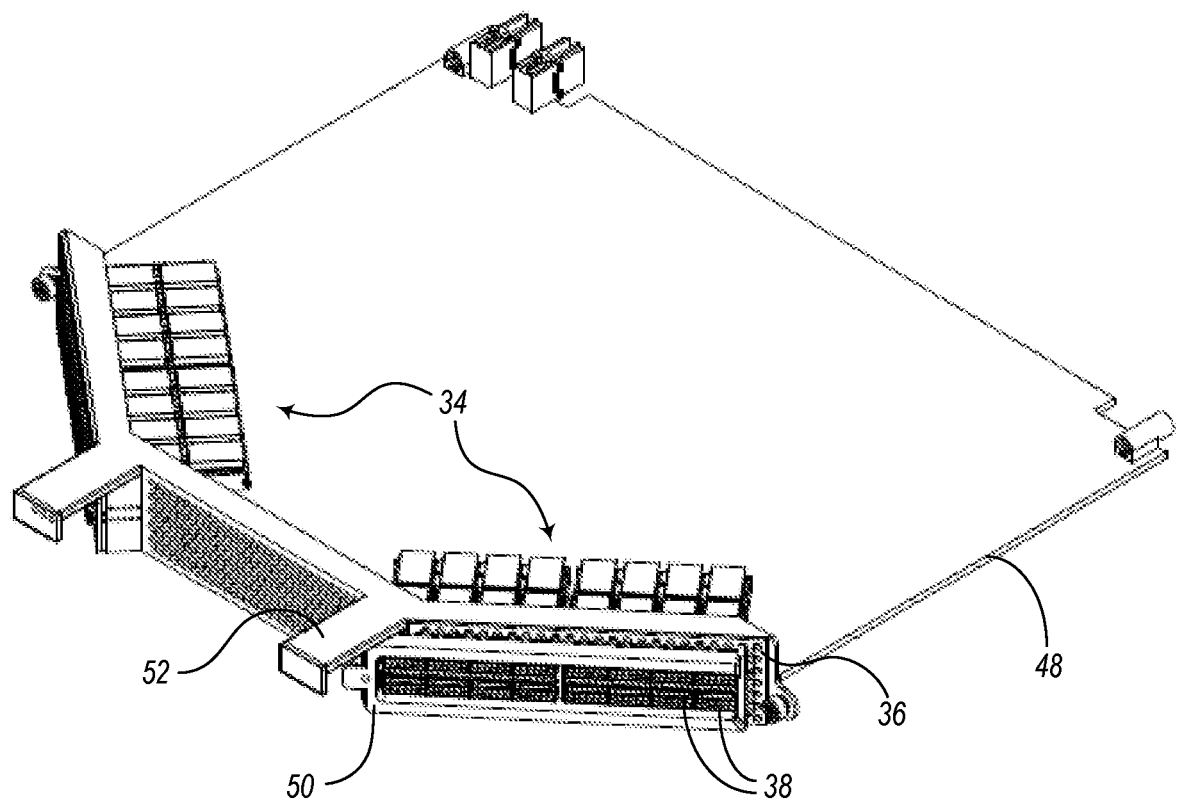
FIG. 5 is a diagram illustrating an isometric view of a line card configured to support one or more plug receptacle cages with a first protection element connected to a faceplate supporting a circuit pack, according to various embodiments.
Figure 6:
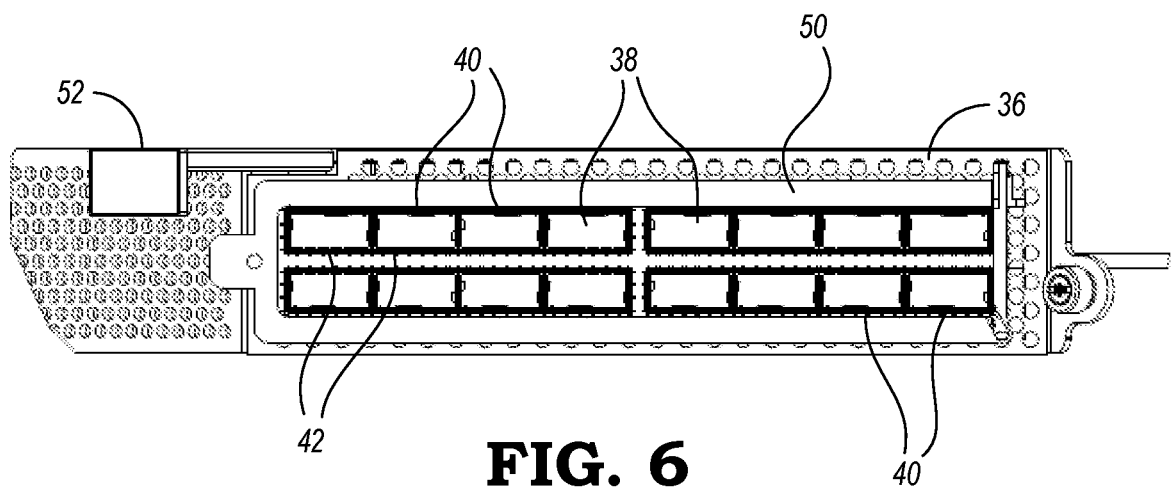
FIG. 6 is a diagram illustrating a front view of the sockets and faceplate shown in FIG. 5 with the first protection element installed, according to various embodiments.

FIG. 5 shows a view of a line card 48 (e.g., card, substrate, board, etc.) configured to support one or more arrays of plug receptacle cages 34. As shown in FIG. 5, a first embodiment of a protection element 50 is connected to the faceplate 36 that supports the plug receptacle cages 34. FIG. 6 shows a front view of the sockets 38 and the faceplate 36, with the protection element 50 installed. When the protection element 50 is installed on the faceplate 36, a top arm of the protection element 50 may be configured to be adjacent to the top edge 40 of the top row of sockets 38 and a bottom arm of the protection element 50 may be configured to be adjacent to the top edge 40 of the bottom row of (upside-down) sockets 38.

The protection element 50 shown in FIGS. 5 and 6 may be used with any type of line card (e.g., line card 48) having a physical structure at the front of the line card that allows the protection element 50 to be removed by sliding it to the side (e.g., toward the left from the perspective of FIG. 6). For example, the line card may have a physical part 52 that extends out horizontally, but would not interfere with the protection element 50 as it is being slid off to the side, which can be seen more clearly in FIG. 5.

It may be understood that the depth of the protection element 50 may be configured to prevent the pluggable module 10 from being fully inserted into the socket 38, but allows the elongated body 14 of the pluggable module 10 to be partially inserted therein.

Therefore, for shipping purposes, the protection element 50 can be installed on the faceplate 36 and the pluggable modules 10 can be partially inserted into the correct sockets 38. Then, when the networking equipment has been delivered to the site (e.g., data center), the protection element 50 can be removed, such as by sliding it to the side, allowing the user to easily push the pluggable modules 10 further into the apertures of the sockets 38 for connection engagement.

Figure 7:
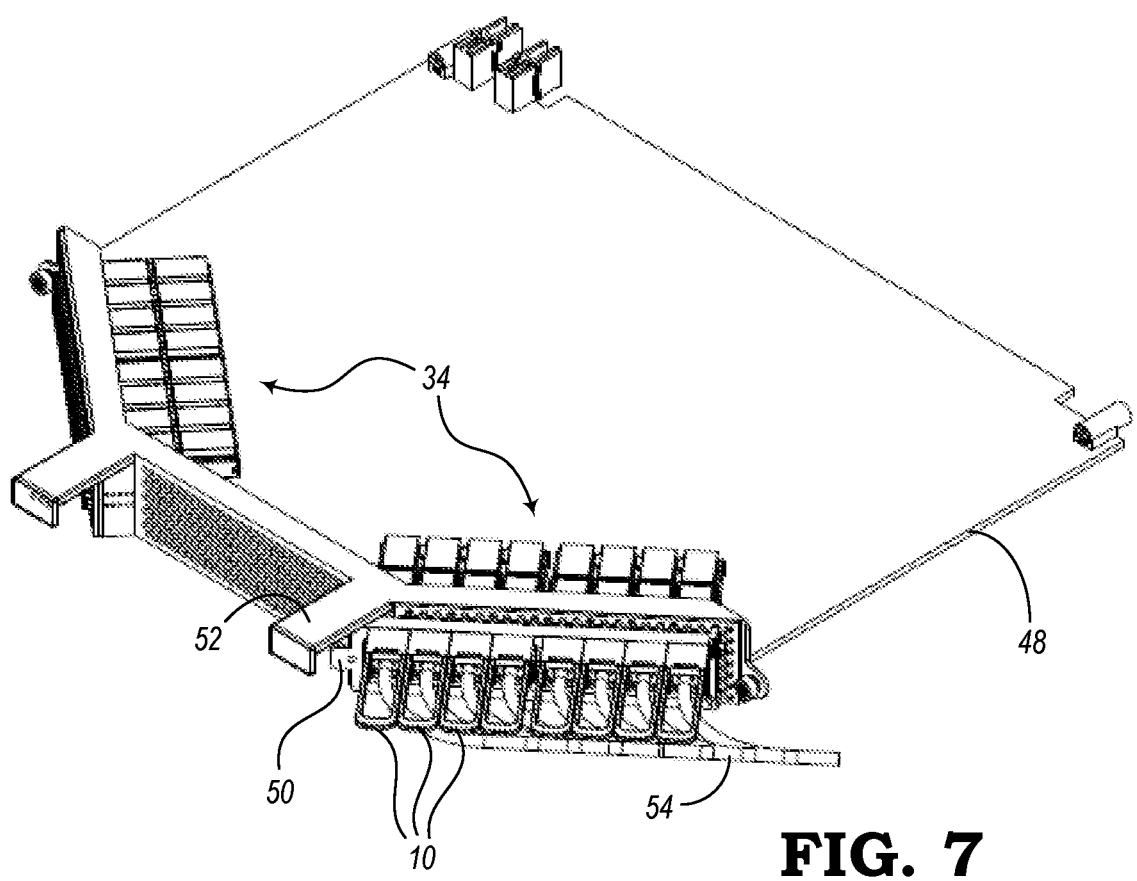
FIG. 7 is a diagram illustrating an isometric view of the line card of FIG. 5 with multiple pluggable modules inserted into multiple sockets of the circuit pack with the first protection element installed, according to various embodiments.
Figure 8:
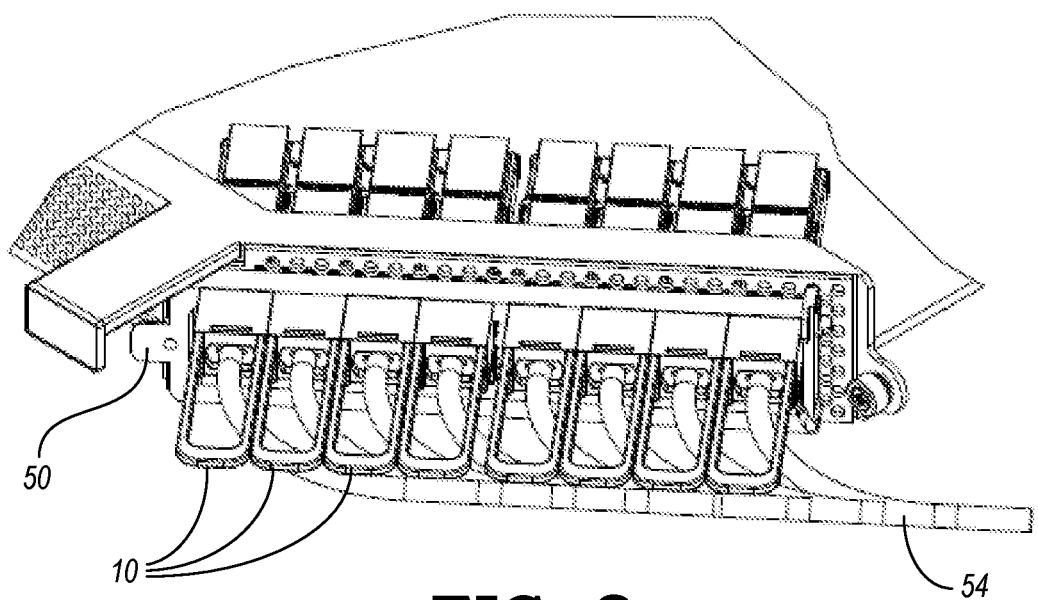
FIG. 8 is a diagram illustrating an isometric close-up view of the multiple pluggable modules and the first protection element shown in FIG. 7, according to various embodiments.

FIG. 7 shows a view of the line card 48 where multiple pluggable modules 10 have been partially inserted into multiple sockets 38 of the plug receptacle cages 34 with the first embodiment of the protection element 50 installed. FIG.

8 shows a close-up view of the multiple pluggable modules 10 and the first protection element 50.

Figure 9:
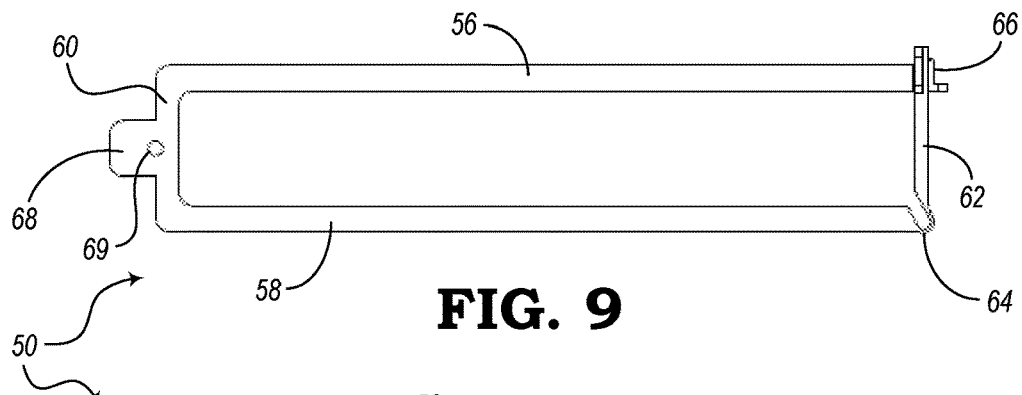
FIG. 9 is a diagram illustrating a front view of the first protection element, according to various embodiments.
Figure 10:
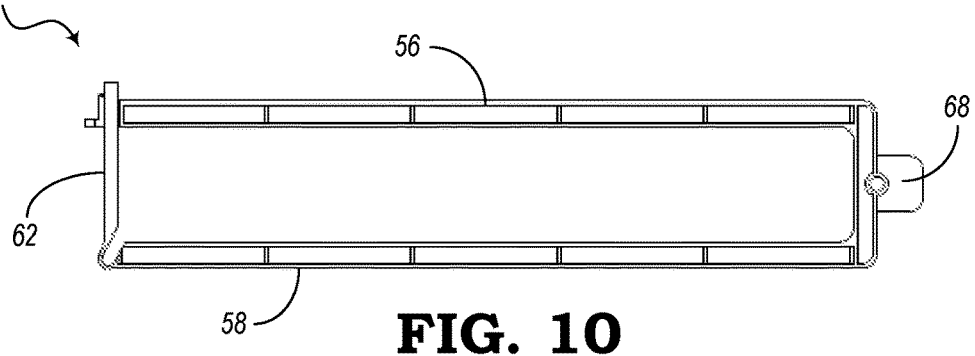
FIG. 10 is a diagram illustrating a back view of the first protection element, according to various embodiments.
Figure 11:
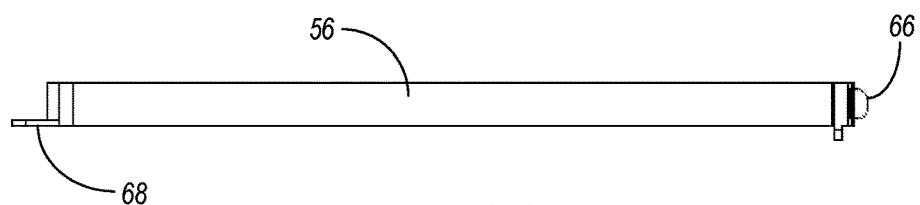
FIG. 11 is a diagram illustrating a top view of the first protection element, according to various embodiments.
Figure 12:
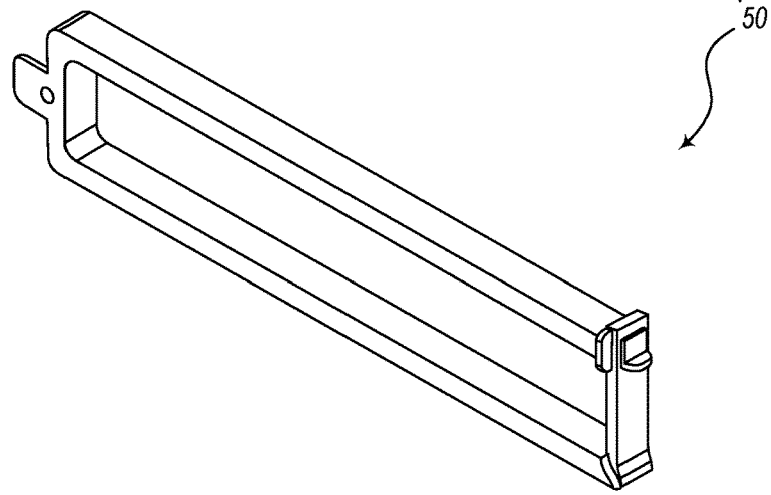
FIG. 12 is a diagram illustrating an isometric view of the first protection element, according to various embodiments.

FIGS. 9-12 show different views of the protection element 50 according to the first embodiment. FIG. 9 shows a front view of the protection element 50, FIG. 10 shows a back view, FIG. 11 shows a top view, and FIG. 12 shows an isometric view. The protection element 50, according to this embodiment, includes a top arm 56, a bottom arm 58, and a shoulder 60 connected to one end of the top arm 56 and bottom arm 58. The protection element 50 further includes a connecting arm 62 that is attached to another end of the bottom arm 58 via an elbow 64. The connecting arm 62 is attachable to the top arm 56 by a latch 66. The shoulder 60 may include a tab 68 that allow a user to easily hold onto the protection element 50 for sliding the protection element 50 away from the sockets 38. The tab 68 may include a fastening aperture 69 for allowing the protection element 50 to be secured to the faceplate 36 for keeping the protection element 50 in place at the edges of the sockets 38. The line card 48 may include corresponding physical features on the faceplate 36, which may be aligned with the fastening aperture 69 to allow the protection element 50 to be fastened to the faceplate 36.

To insert the protection element 50, a shipper may simply place the protection element 50 (with the latch 66 latched) over the edges of the sockets 38. In some cases, the shipper may unlatch the latch 66 first before placing the protection element 50 over the edges, and then latch the latch 66 thereafter. Then, the shipper may affix the protection element 50 to the faceplate 36, such as by screwing a screw through the fastening aperture 69 and through a corresponding screw hole in the faceplate 36. Once the protection element 50 is attached, the pluggable modules 10 may be partially inserted into their proper sockets 38 until the abutments or beveled edges abut the top arm 56 of the protection element 50. Other shipping components or shipping materials may be used (e.g., zip ties, foam, etc.) to hold the pluggable modules 10 in their partially inserted position so that they will not slide out of the sockets 38.

When the networking equipment has been delivered to the site where the equipment will operate, a person on site can then easily set up the equipment for use. For example, once the shipping components have been removed, the user may disconnect the fastener (e.g., screw) from the fastening aperture 69. Then, the user can unlatch the latch 66 and slide the protection element 50 to the side to free the protection element 50 from the sockets. This also allows the pluggable modules 10 to be pushed forward further into the corresponding sockets 38 to cause the electrical interface 18 to engage with the connector elements of the socket 38. Also, with the pluggable modules 10 already matched with the correct socket 38, the user can easily connect the equipment without any trouble.

Figure 13:
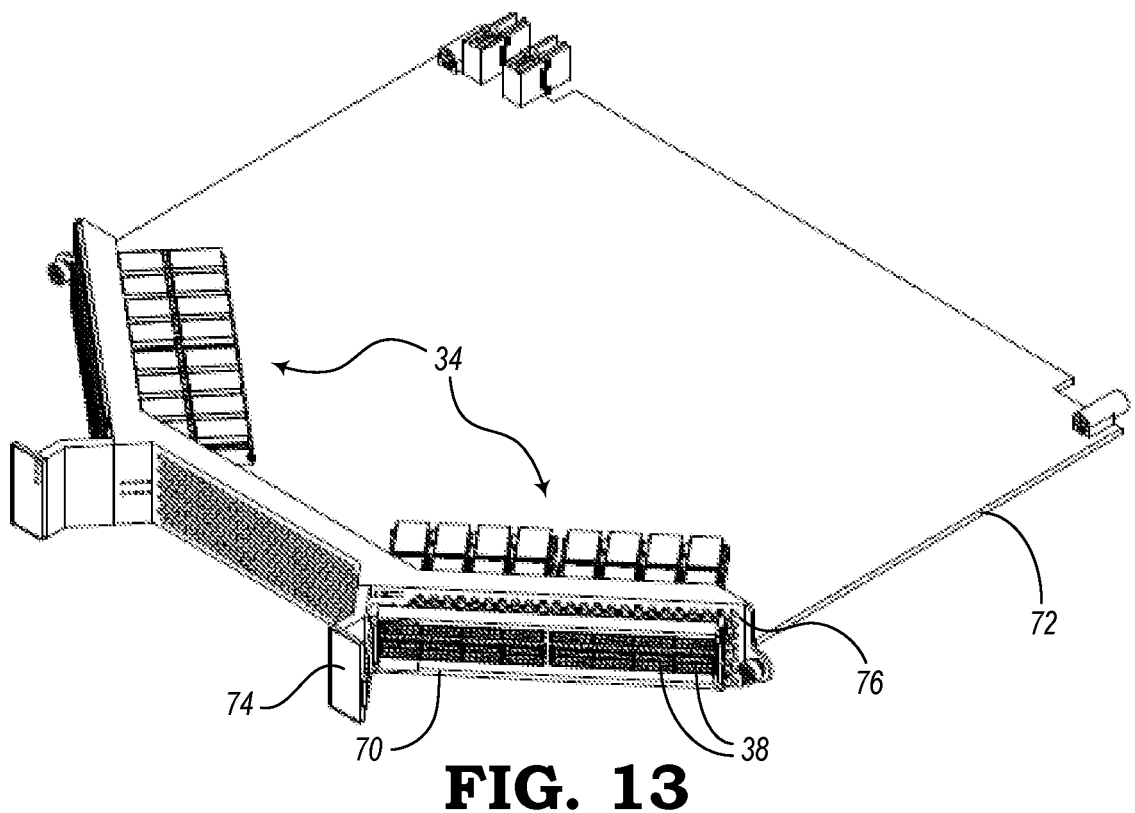
FIG. 13 is a diagram illustrating an isometric view of a line card configured to support one or more plug receptacle cages with a second protection element connected to a faceplate supporting a circuit pack, according to various embodiments.

FIG. 13 show a second embodiment of a protection element 70 that is connected to another type of line card 72 (e.g., card, substrate, board, etc.) having a physical part 74 that extends in a vertical direction. Since this configuration of the line card 72 might not allow the first protection element 50 to be easily removed, since it might not be able to slide to the side in that case, the protection element 70 according to this second embodiment is coordinated with the line card 72 design to allow the protection element 70 to also be easily removed in a different way.

The line card 72 is configured to support one or more plug receptacle cages 34, which may be the same as or similar to the plug receptacle cages 34 discussed above with respect to FIGS. 5 and 7. Again, the plug receptacle cages 34 include sockets 38 that may also be the same as or similar to the sockets 38 discussed above with respect to FIGS. 3-8. The protection element 70 of this second embodiment may be connected to a faceplate 76 that supports the plug receptacle cages 34.

Figure 14:
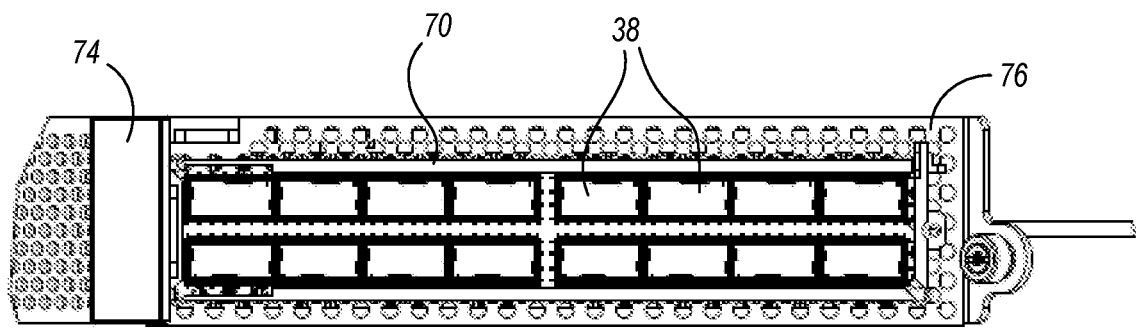
FIG. 14 is a diagram illustrating a front view of the faceplate shown in FIG. 13 with the second protection element installed thereon, according to various embodiments.

FIG. 14 illustrates a front view of the faceplate 76 and the sockets 38 exposed through the faceplate 76. The sockets 38 may also be arranged with a top row and a bottom row, where the bottom row may be configured to receive the pluggable modules 10 upside-down. Thus, a top portion and bottom portion of the second protection element 70, when installed, may be configured adjacent to the edge of the sockets 38 configured next to the top surface 24 of the elongated body 14 of the pluggable module 10 as the pluggable module 10 is being inserted therein.

Figure 15:
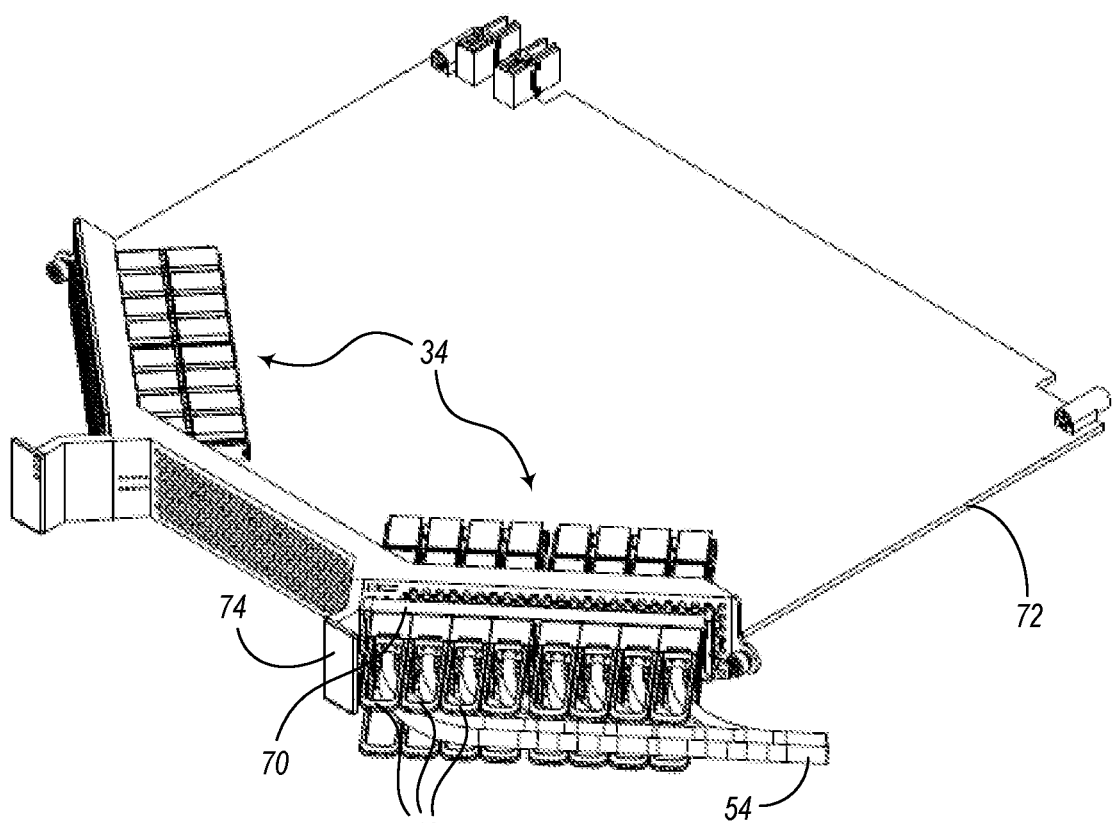
FIG. 15 is a diagram illustrating an isometric view of the line card of FIG. 13 with multiple pluggable modules inserted into multiple sockets of the circuit pack with the second protection element installed, according to various embodiments.
Figure 16:
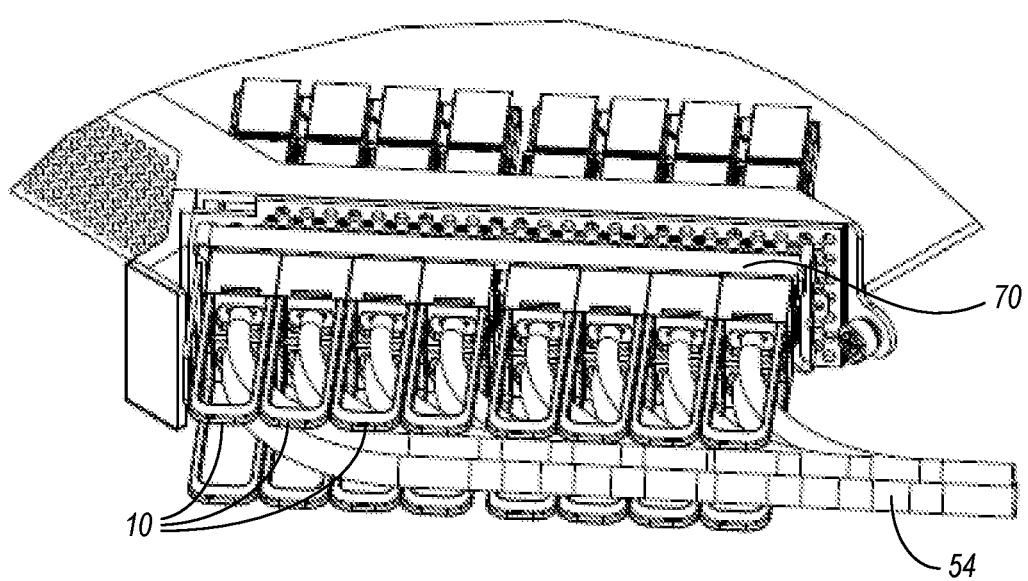
FIG. 16 is a diagram illustrating an isometric close-up view of the multiple pluggable modules and second protection element shown in FIG. 15, according to various embodiments.

FIG. 15 shows a view of the line card 72 of FIG. 13 with multiple pluggable modules 10 partially inserted into multiple sockets 38 of the plug receptacle cages 34 with the second protection element 70 installed. FIG. 16 show a close-up view of the multiple pluggable modules 10 and the second protection element 70. Again, the protection element 70 blocks the pluggable modules 10 from being fully inserted in the sockets 38, but allows them to be positioned within their matching sockets 38 during shipping.

Figure 17:
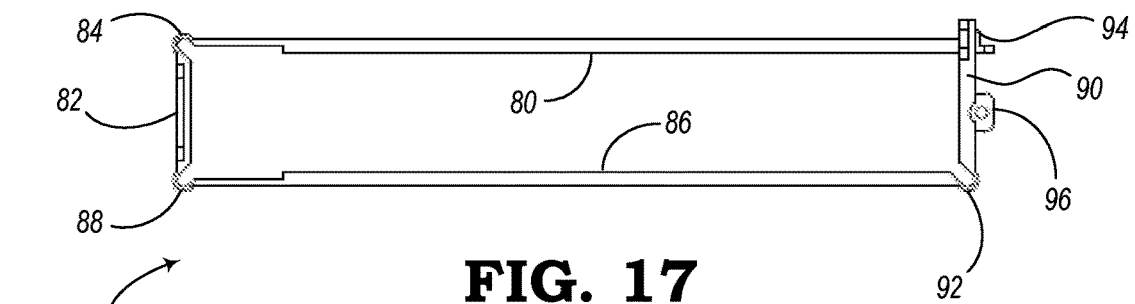
FIG. 17 is a diagram illustrating a front view of the second protection element, according to various embodiments.
Figure 18:
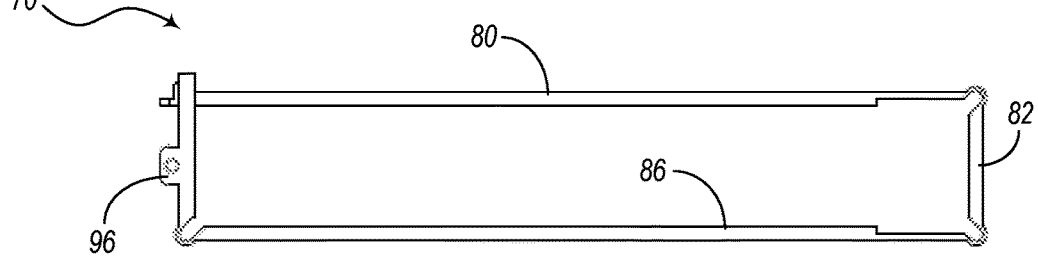
FIG. 18 is a diagram illustrating a back view of the second protection element, according to various embodiments.
Figure 19:
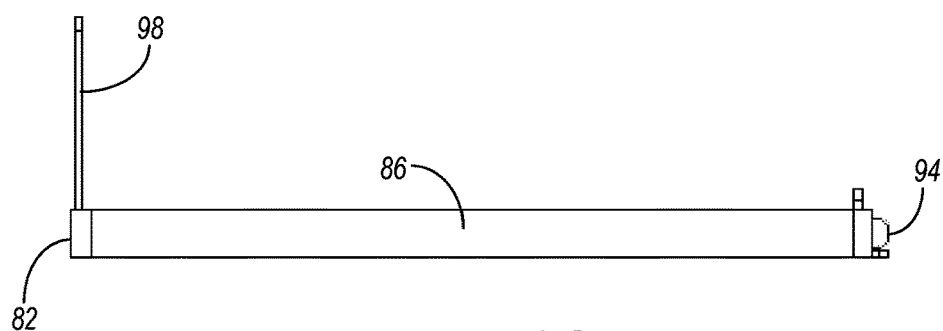
FIG. 19 is a diagram illustrating a bottom view of the second protection element, according to various embodiments.
Figure 20:
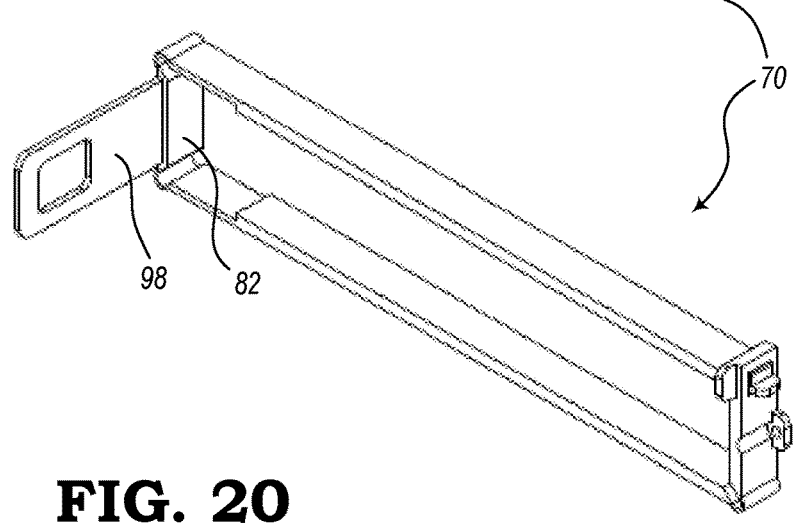
FIG. 20 is a diagram illustrating an isometric view of the second protection element, according to various embodiments.

FIGS. 17-20 illustrate different views of the protection element 70 according to the second embodiment. FIG. 17 is a front view of the second protection element 70, FIG. 18 is a back view, FIG. 19 is a bottom view, and FIG. 20 is an isometric view. The protection element 70 is configured for use in an environment where it may impossible or difficult to be removed by sliding it to the side. In this embodiment, the protection element 70 can be unlatched and folded in any suitable way to allow it to be removed by pulling it straight out from the sockets 38.

The protection element 70 includes a top arm 80, a vertical member 82 attached to the top arm 80 by a first elbow 84, a bottom arm 86 attached to the vertical member 82 by a second elbow 88, and a connecting arm 90 attached to the bottom arm 86 by a third elbow 92. The connecting arm 90 and top arm 80 include associated elements that form a latch 94 for latching the connecting arm to the top arm 80. Also, the connecting arm 90 includes a fastening element 96 having an aperture or other suitable features for enabling the protection element 70 to be fastened to the faceplate 76. As shown in FIG. 20, the vertical member 82 includes an extension 98 that extends out from the vertical member 82. The user may hold onto the extension 98 when the protection element 70 is being removed.

Figure 21:
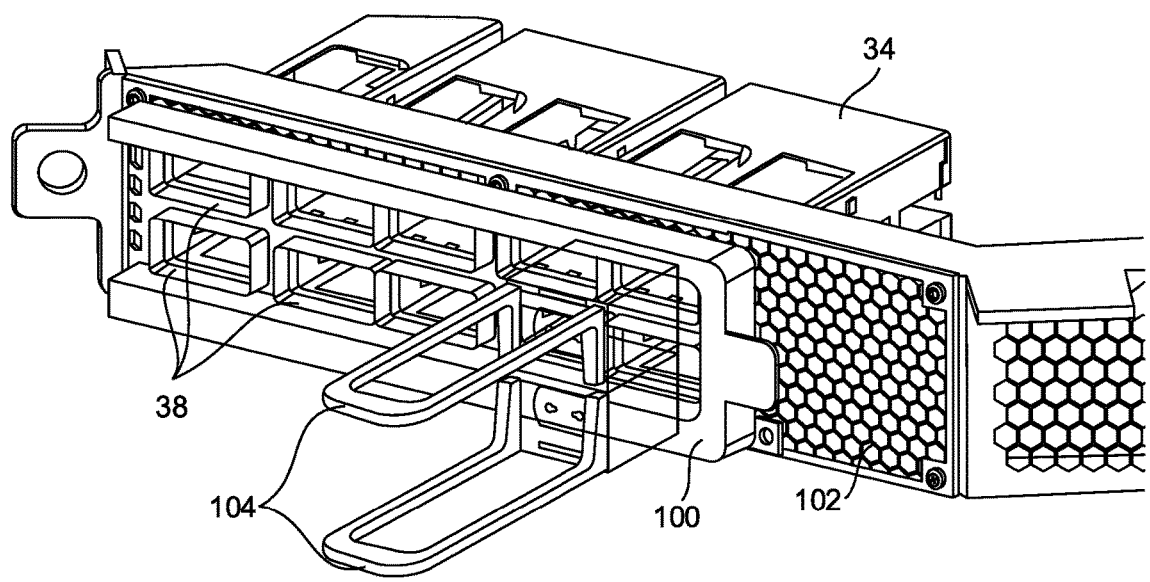
FIG. 21 is a diagram illustrating an isometric view of a third protection element installed on a faceplate supporting a circuit pack, according to various embodiments.
Figure 22:
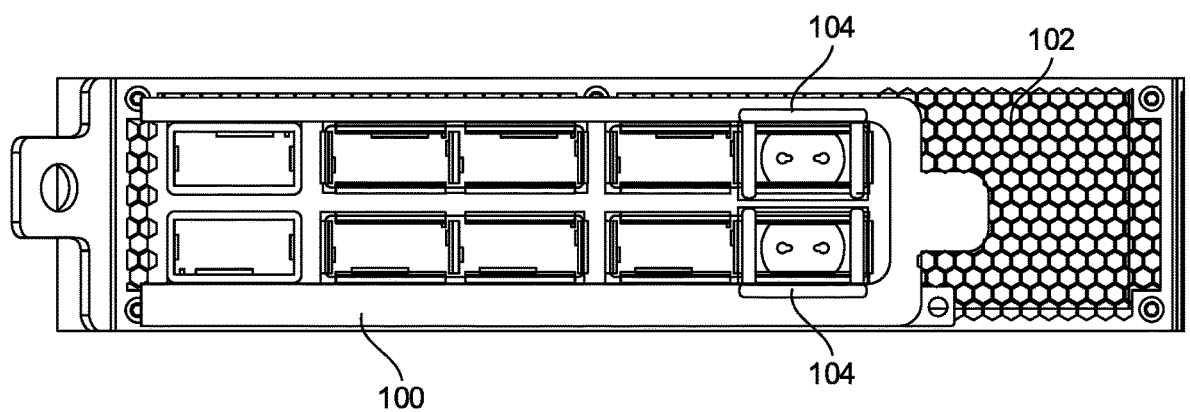
FIG. 22 is a diagram illustrating a front view of sockets of the circuit pack and the third protection element shown in FIG. 21, according to various embodiments.
Figure 23:
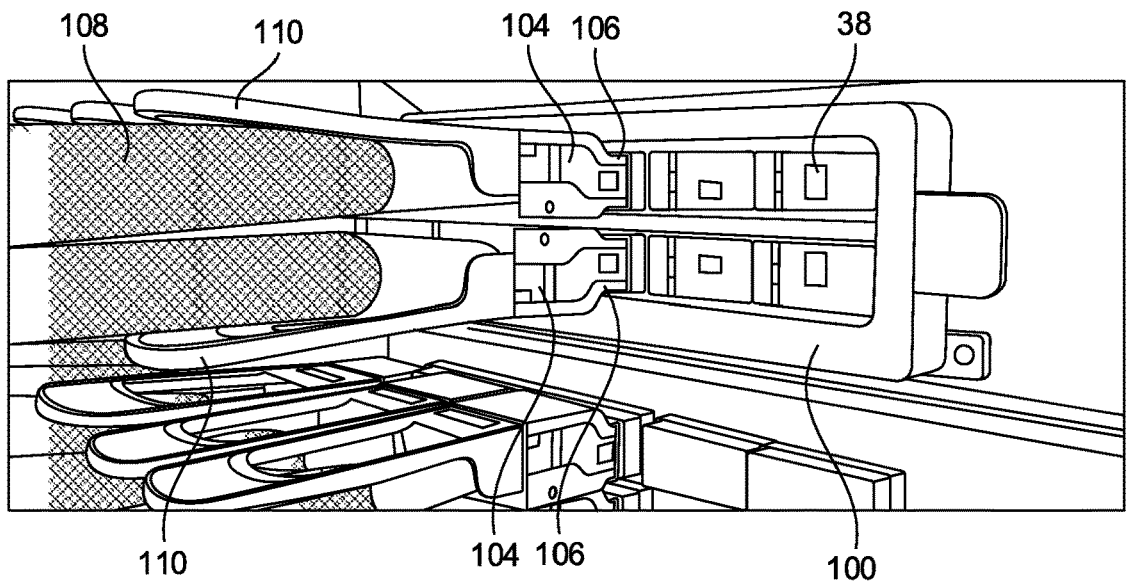
FIGS. 23 and 24 are diagrams illustrating perspective views of the third protection element, according to various embodiments.
Figure 24:
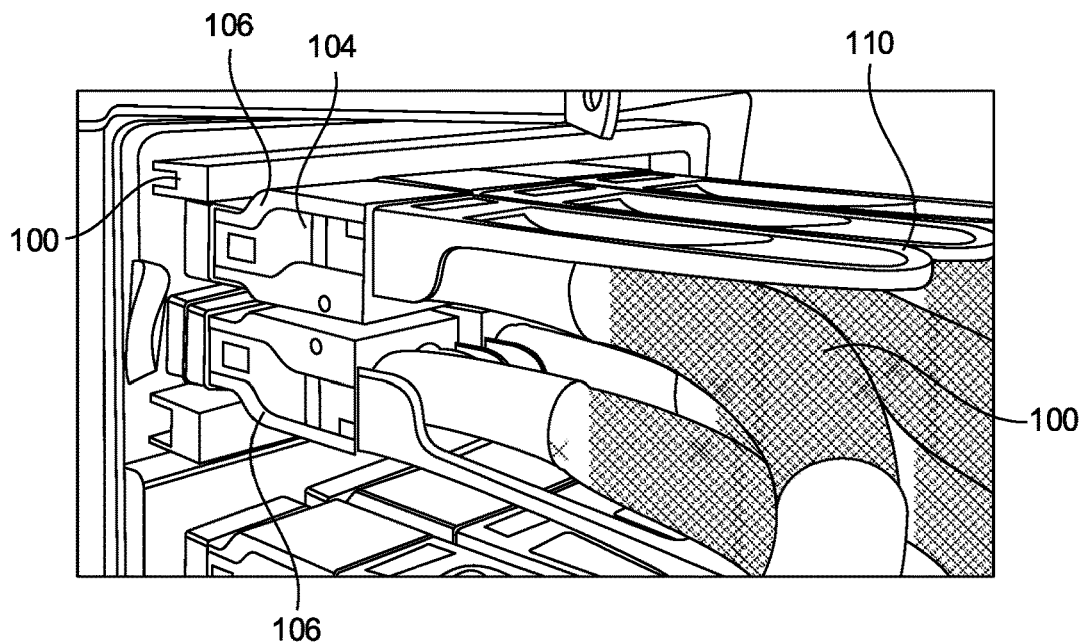

FIG. 21 shows a third embodiment of a protection element 100 that may be installed on a faceplate 102 that supports plug receptacle cages 34, which may be the same as or similar to the plug receptacle cages 34 described above. FIG. 22 shows a front view of sockets 38, which may be the same as or similar to the sockets 38 described above, with the third protection element 100 installed. FIGS. 23 and 24 show images of the third protection element 100 in use. As shown in FIGS. 23 and 24, a similar type of pluggable module 104 is shown.

In this example, the pluggable module 104 includes top beveled edge 106 that comes into contact with the protection element 100 when the pluggable module 104 is inserted in the socket 38 as far as it can go. Because of the depth of the protection element 100 and because the pluggable module 104 is blocked by the protection element 100, the pluggable module 104 cannot be inserted fully within the socket 38. A top row of sockets 38 receives the pluggable modules 104 in a right side up manner such that the top beveled edge 106 contacts the top portion of the protection element 100. A bottom row of sockets 38 receives the pluggable modules 104 in an upside-down manner such that the top beveled edge 106 contacts the bottom portion of the protection element 100.

Fiber optic cable 108 may also be attached to the pluggable modules 104, which allows pre-cabling at the factory to make proper connections without relying on an expert at the data center. It may also be noted that handles 110 of the pluggable modules 104 (as with the handles 32 of pluggable modules 10) may be further configured to provide protection for the fiber optic cables 108.

Figure 25:
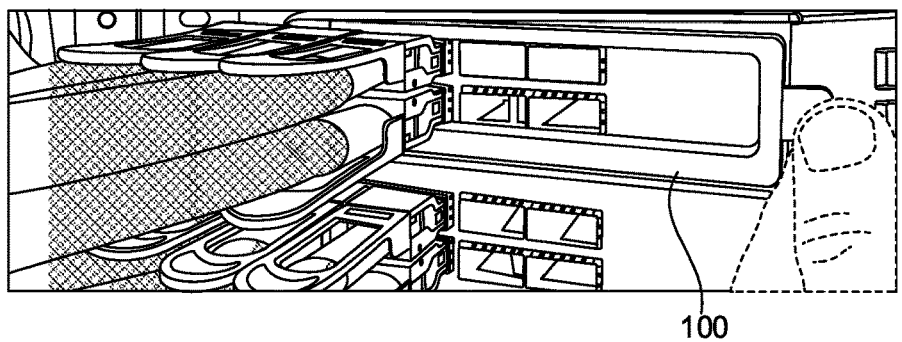
FIG. 25 is a diagram illustrating a perspective view of the third protection element being removed, according to various embodiments.

FIG. 25 shows a perspective view of the third protection element 100 as it is being removed, such as by sliding the protection element 100 towards the right.

Figure 26:
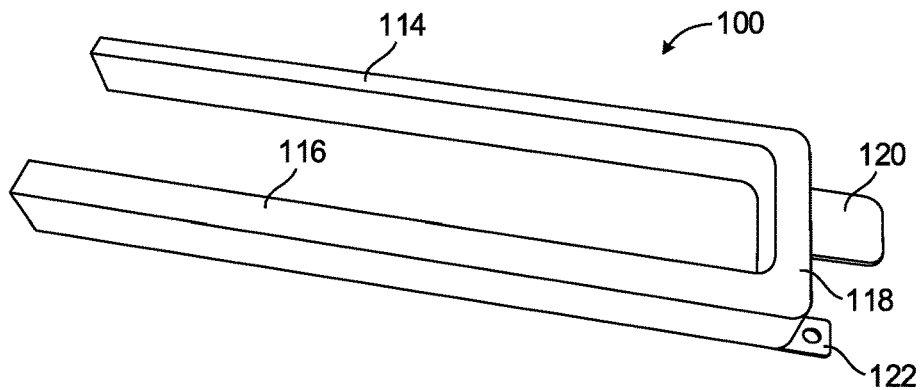
FIG. 26 is a diagram illustrating a front perspective view of the third protection element, according to various embodiments.
Figure 27:
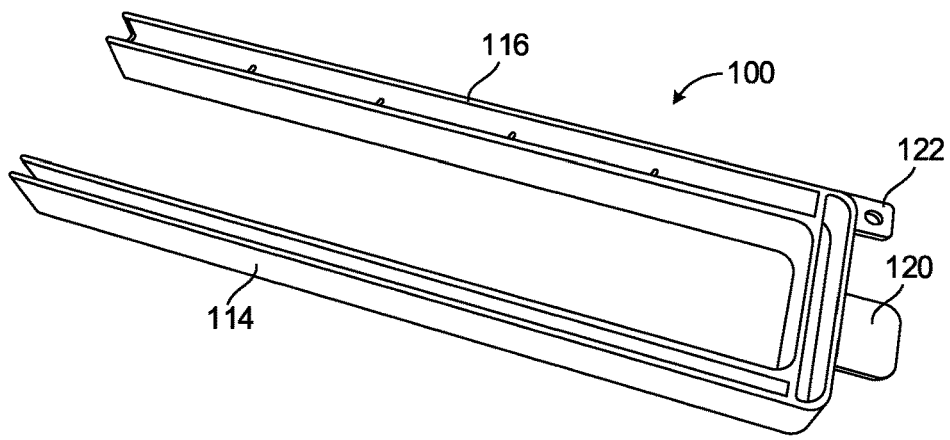
FIG. 27 is a diagram illustrating a back perspective view of the third protection element, according to various embodiments.

FIG. 26 shows a front perspective view of the protection element 100 according to third embodiment. FIG. 27 shows a back view of the third protection element 100. The protection element 100 includes a top arm 114, a bottom arm 116, and a shoulder 118 attached to the top arm 114 and bottom arm 116. The protection element 100 also includes a tab 120 that a user can grasp while sliding the protection element 100 to the right to remove it from its position next to the sockets 38. Also, the protection element 100 may include a fastener element 122, which may include an aperture configured to receive a fastening device (e.g., screw, bolt, etc.).

Figure 28:
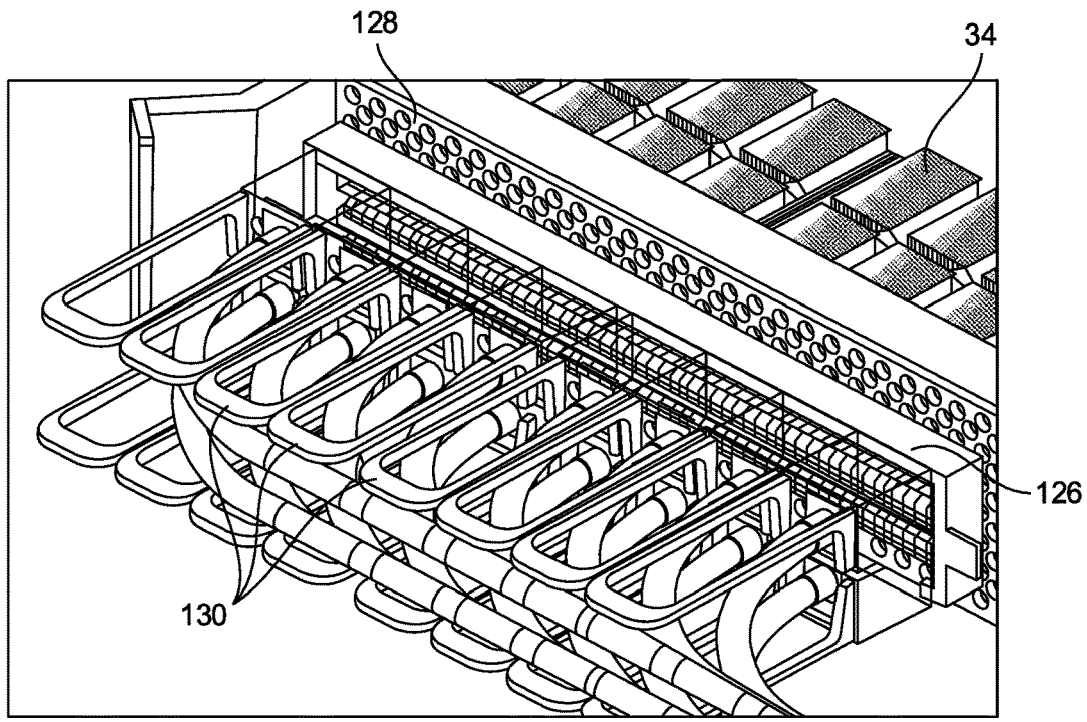
FIG. 28 is a diagram illustrating an isometric view of a fourth protection element installed on a faceplate supporting a circuit pack, according to various embodiments.
Figure 29:
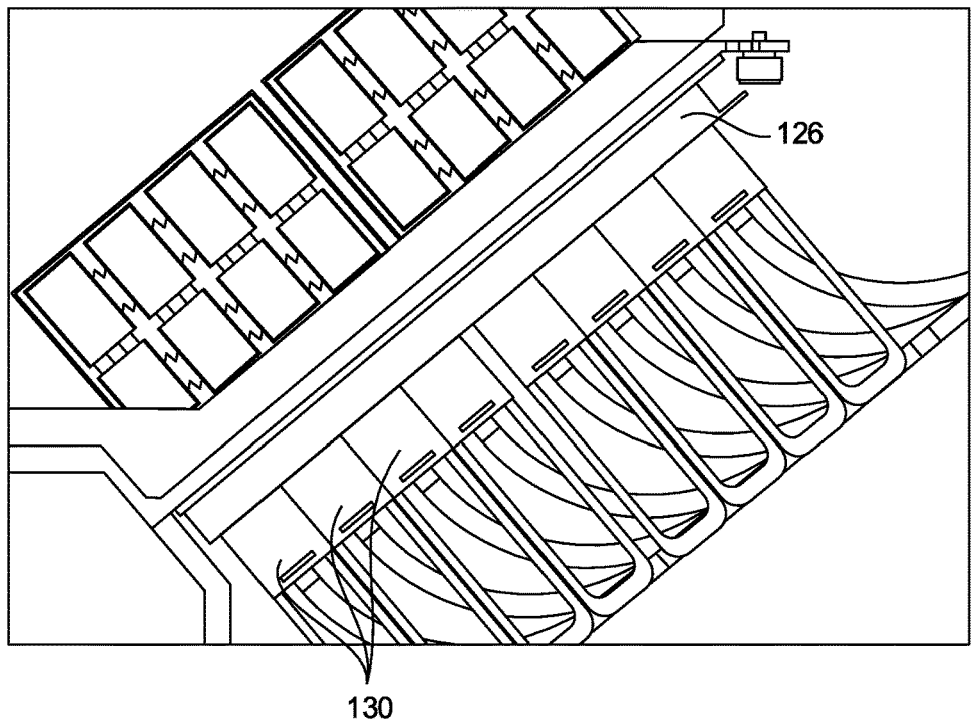
FIG. 29 is a diagram illustrating a top view of the fourth protection element in use, according to various embodiments.

FIG. 28 illustrates another protection element 126 according to a fourth embodiment. The protection element 126 is installed on a faceplate 128 that is configured to support plug receptacle cages 34. FIG. 29 is a top view of the fourth protection element 126 in use. A plurality of pluggable modules 130 (e.g., similar to pluggable modules 10, 104) are partially inserted into the sockets 38, the depth of which is restricted by the protection element 126.

Figure 30:
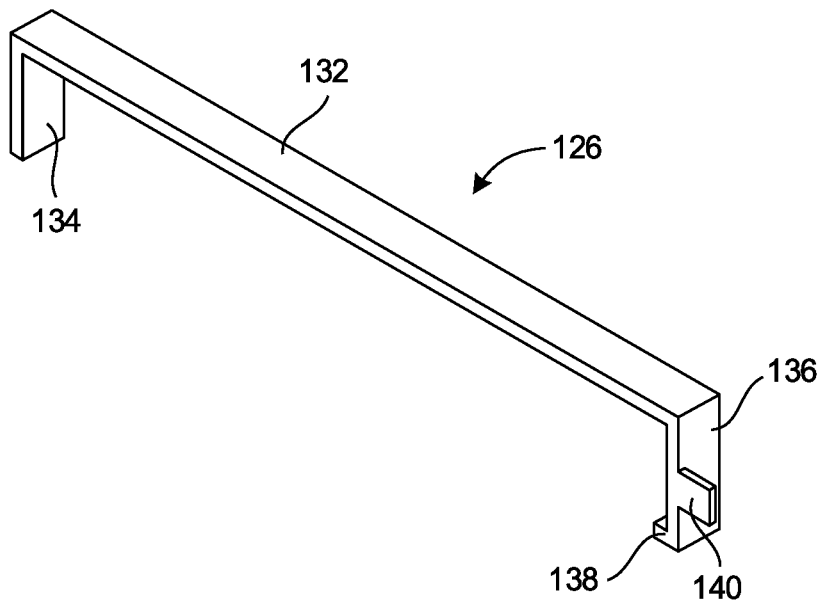
FIG. 30 is a diagram illustrating a front isometric view of the fourth protection element, according to various embodiments.
Figure 31:
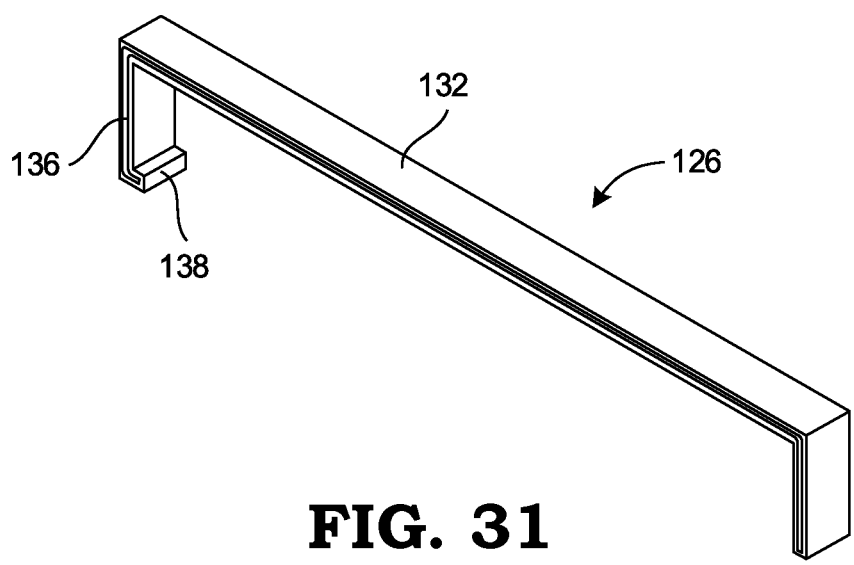
FIG. 31 is a diagram illustrating a back isometric view of the fourth protection element, according to various embodiments.

FIG. 30 shows a front isometric view of the fourth protection element 126 and FIG. 31 shows a back isometric view. In this embodiment, the protection element 126 includes a top arm 132, a first vertical element 134 attached to one end of the top arm 132, and a second vertical element 136 attached to the other end of the top arm 132. The second vertical element 136 includes a foot 138 that is pointed toward the first vertical element 134. The second vertical element 136 also includes a tab 140 that can be used to assist a user with removing the protection element 126.

The protection element 126 in this embodiment may be used to only block the full insertion of the pluggable modules 130 arranged along one row of sockets 38. If the pluggable modules 130 are arranged in multiple rows of sockets 38, one protection element 126 may be installed for each respective row. The protection element 126 is configured to bend easily to enable the installation around the pluggable modules 130 and to enable the easy removal of the protection element 126. To remove the protection element 126, the user may hold onto the tab 140 and pull the second vertical element 136 until the foot 138 is clear of the last pluggable module 130 on that row. The top arm 132 may be configured to bend sufficiently to allow the foot 138 to disengage from the pluggable module 130.

Figure 32:
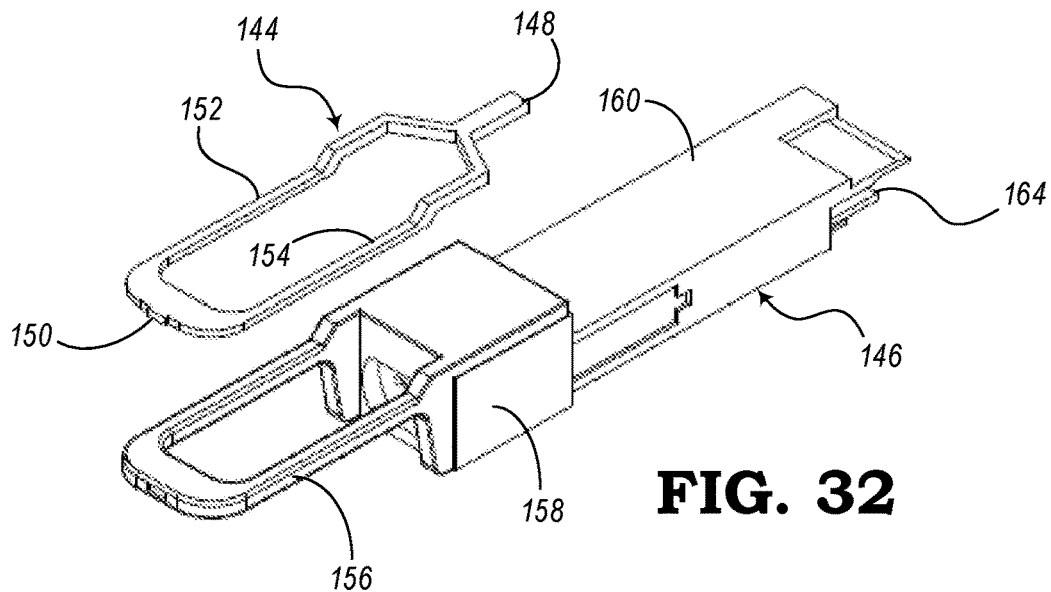
FIG. 32 is a diagram illustrating an isometric view of some of the components of a connection indicator system to be installed on a pluggable module, according to various embodiments.
Figure 33:
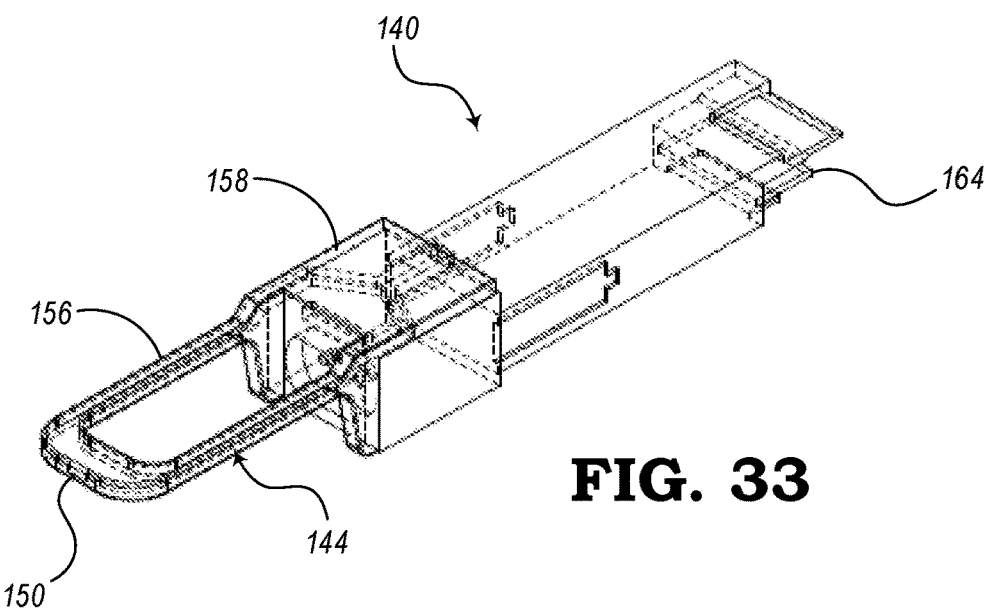
FIG. 33 is a diagram illustrating an isometric view of the connection indicator system of FIG. 32 installed on the pluggable module, according to various embodiments.
Figure 34:
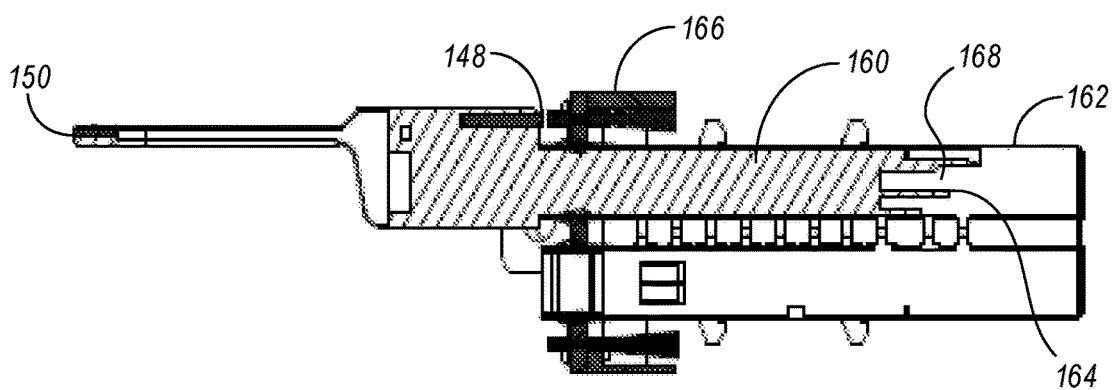
FIG. 34 is a diagram illustrating a side cross-sectional view of the connection indicator system, according to various embodiments.

FIGS. 32-34 show a connection indicator system 142. FIG. 32 illustrates a light pipe 144 that may be inserted into a pluggable module 146. FIG. 33 shows the light pipe 144 incorporated into the pluggable module 146. The light pipe 144 may be part of the connection indicator system 142 that may be used to indicate to a user when the pluggable module 146 has been fully inserted into a respective socket (e.g., socket 38).

The light pipe 144 may include an entry 148 and an exit tip 150. The entry 148 and exit tip 150 are connected via a first light path 152 and a second light path 154. Light received at the entry is emitted out the exit tip 150 via the first and second light paths 152, 154. As shown in FIG. 33, the exit tip 150 is visible through a window at a front end of a handle 156. The first and second light paths 152, 154 extend through the side portions of the handle 156 and partially through a head 158 of the pluggable module 146. The entry 148 receives light through a rear window at the back of the head 158. A body 160 of the pluggable module 146 is inserted into a socket of a circuit pack 162, as shown in the cross-sectional side view of FIG. 34. Other portions of the connection indicator system 142 are also shown in FIG. 34. When the circuit pack 162 determines that the pluggable module 146 has been inserted such that the electrical interface 164 of the pluggable module 146 is electrically connected to a corresponding connector in the circuit pack 162, the connection indicator system 142 is configured to illuminate a light source 166 (e.g., Light Emitting Diode (LED) or other suitable light emitting device). The light from the light source 166 is directed toward the entry 148 and is emitted out the front window at the exit tip 150 in the handle 156. In some embodiments, the light source 166 may be configured to illuminate a green light when a good connection is made, a red light when no connection is made, and a yellow light if there is an error with the connection.

Figure 35:
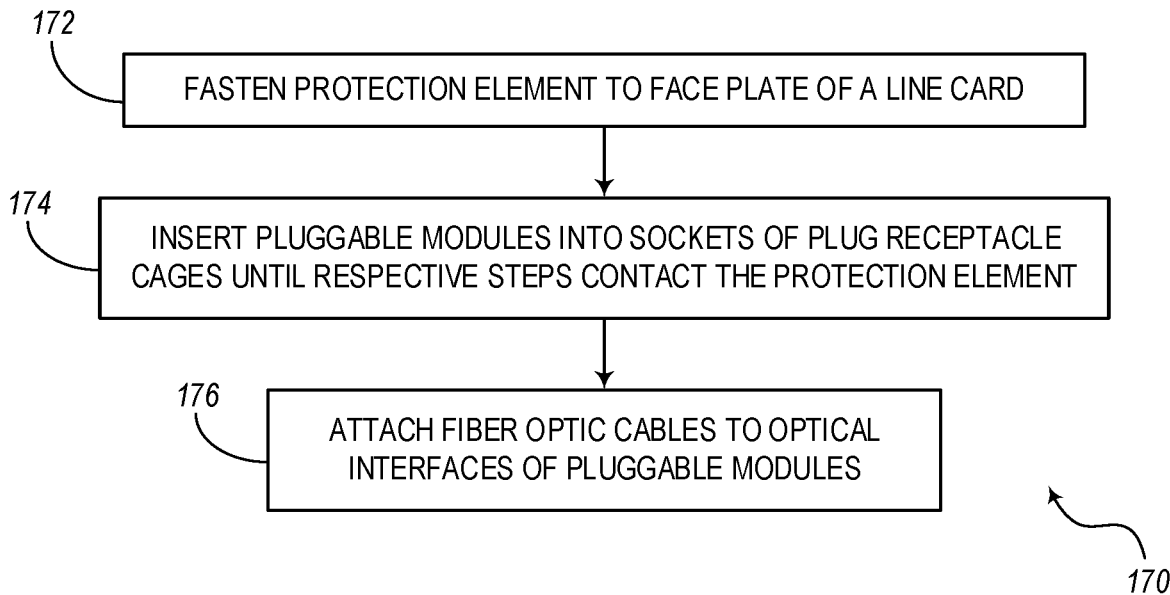
FIG. 35 is a flow diagram illustrating a process to be performed at a factory for preparing networking equipment for shipping, according to various embodiments.

FIG. 35 is a flow diagram illustrating an embodiment of a process 170 that may be performed at a factory where the networking equipment is manufactured or at a warehouse where the equipment is stored. The process 170 may be performed to prepare the networking equipment for shipping, particularly the components described with respect to FIGS. 1-34 where pluggable modules are intended to be installed in sockets of a circuit pack. In this embodiment, the process 170 includes fastening a first protection element (e.g., one or more shipping elements) to the face plate of a line card, as indicated in block 172. Fastening may include using one or more screws, bolts, or other fastening elements to secure the first protection element to the face plate. Also, if the first protection element includes a latch, the first protection element may be latched before or after it is fastened to the face plate. The process 170 also includes inserting the pluggable modules into the sockets of a circuit pack supported by the line card until the steps (or beveled edges) of the respective pluggable modules contact the first protection element, as indicated in block 174.

In an optional step, the process 170 may further include attaching fiber optic cables to optical interfaces of the pluggable modules, as indicated in block 176. As described above, these steps put the pluggable modules in a position within the socket only far enough to protect the pluggable modules but not fully inserted such that the electrical contacts, pins, etc. of the pluggable modules are not engaged with corresponding electrical contacts, pins, etc. of the circuit pack. In addition, the process 170 of preparing the networking equipment for shipment may include securing the pluggable modules at the partially inserted position so that they do not slip out of the sockets. For example, this may include using various materials, components, or elements for shipping to hold the pluggable modules in place with respect to the respective line card.

Figure 36:
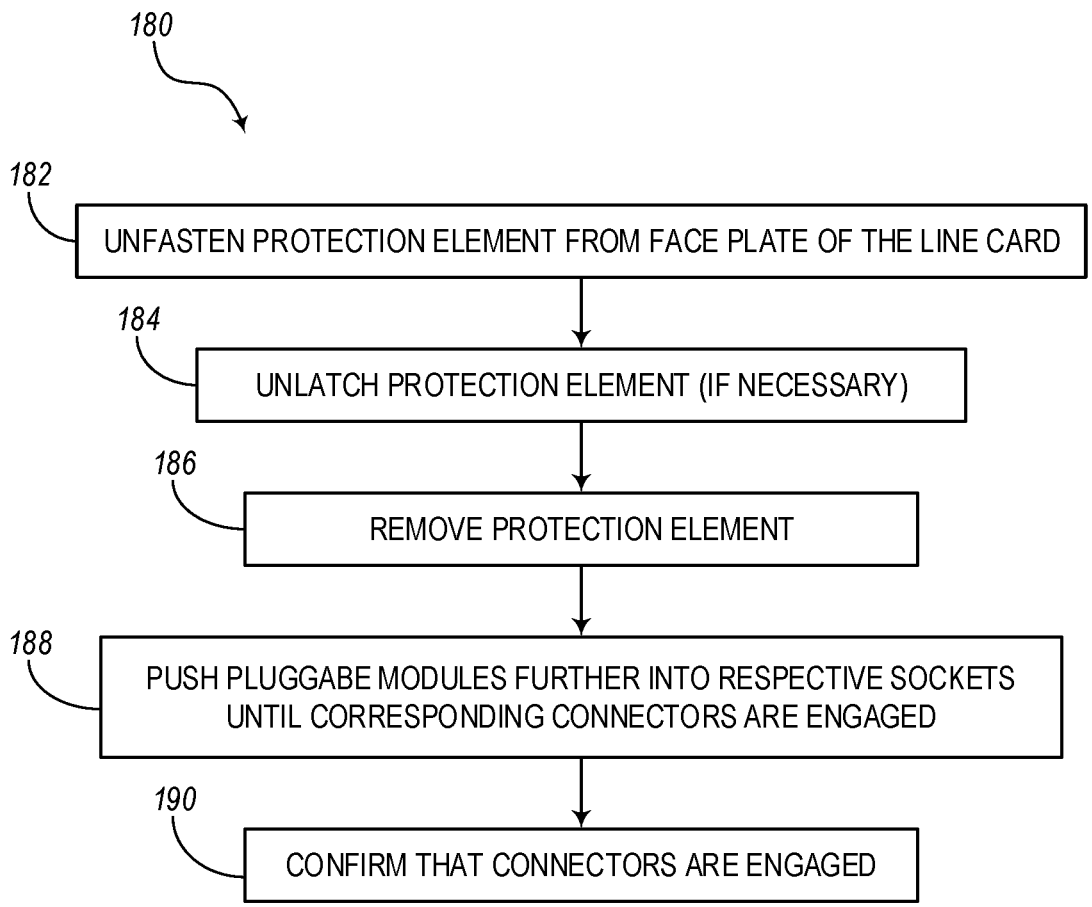
FIG. 36 is a flow diagram illustrating a process to be performed at a data center for setting up the networking equipment for operation, according to various embodiments.

FIG. 36 is a flow diagram illustrating an embodiment of a process 180 to be performed at a data center for setting up the networking equipment for operation. Therefore, after preparing the networking equipment for shipment (e.g., using the process 170 of FIG. 35) and after shipping the equipment to the operation site, the process 180 may be performed on site to set up the equipment for use. The process 180 may include unfastening the first protection element (e.g., the one or more shipping elements) from the face plate of the line card, as indicated in block 182, which may include removing the screws, bolts, etc. The process 180 also includes unlatching the first protection element, as indicated in block 184, if the first protection element includes a latch.

Next, the process 180 may include removing the first protection element from behind the pluggable modules, as indicated in block 186. Depending on the particular embodiment of shipping element (or first protection element) being used, this step (block 186) may include different procedures. For example, some shipping elements may be removed by sliding them to one side or the other. Other shipping elements may be removed by unfolding the arms and pulling the shipping element straight out. Still other shipping elements may be removed by bending portions of the shipping element until it is disengaged from the pluggable modules.

Once the shipping element or first protection element is removed, the process 180 may also include pushing the pluggable modules further into their respective sockets or slots until corresponding connectors are engaged, as indicated in block 188. In some embodiments, an additional step may include confirming that the connectors are properly engaged, as indicated in optional block 190. Confirming proper connection may include utilizing the connection indicator system 142 described with respect to FIGS. 32-34.

Protecting Line Cards within Shelves

While FIGS. 1-36 are related to systems and methods for the use of shipping elements (or first protection elements) that protect pluggable modules in sockets of line cards, FIGS. 37-48 provide additional systems and methods for other types of shipping elements. Specifically, the embodiments of FIGS. 37-48 are directed to protecting line cards within a shelf or cabinet of the networking equipment. The protection of the line cards in the shelves may be done for the same reasons as described above (i.e., to prevent excessive wear of connector elements during shipment).

Therefore, for the preparation of shipping networking equipment, the pluggable modules may first be securely protected in the line cards (FIGS. 1-36) and then those line cards can then be securely protected with the shelves in which they are intended to operate. According to other embodiments, the order may be reversed, whereby the line cards may be protectively installed in the shelf first and then the pluggable modules may be protectively installed in the line cards. Thus, there may be two (or more) levels of protection as described in the present disclosure.

Figure 37:
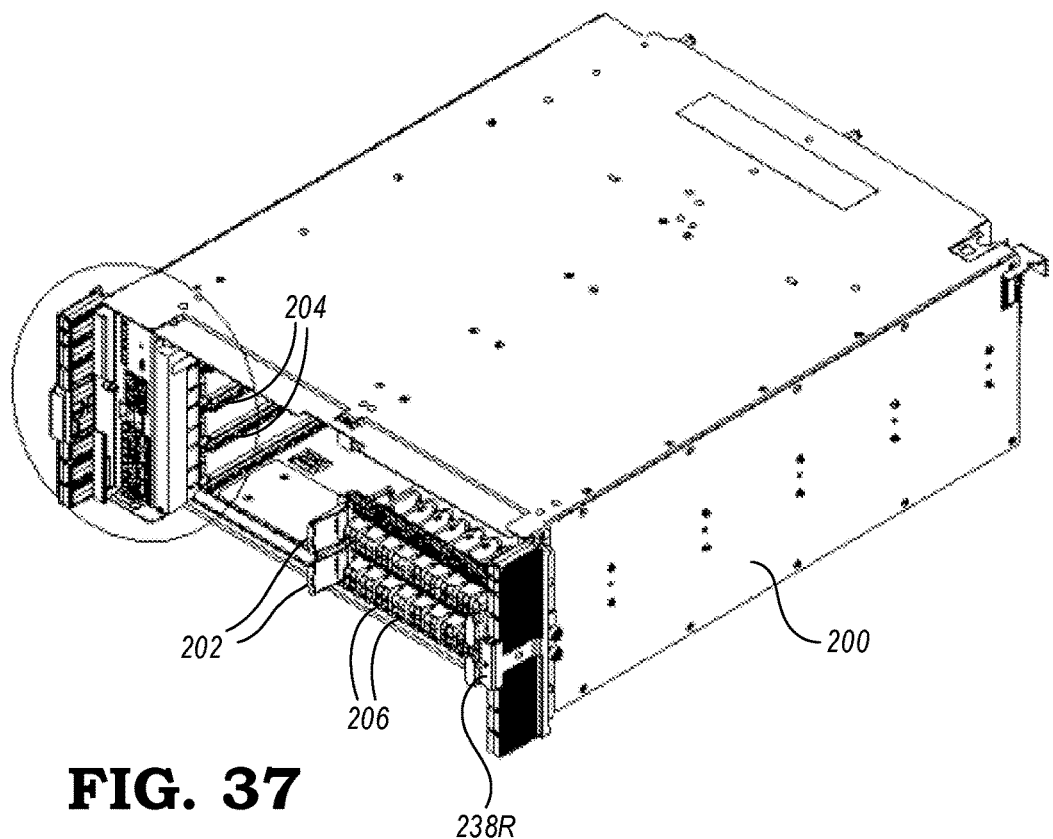
FIG. 37 is a diagram illustrating an isometric view of a shelf with line cards installed and protection elements installed, according to various embodiments.

FIG. 37 shows an isometric view of an embodiment of a shelf 200 having line cards 202. Although the shelf 200 and line cards 202 as shown have a different configuration (i.e., rectangular) compared with the line cards (e.g., line cards 48, 72 having truncated corners), it should be noted that the embodiments described in the present disclosure may apply to any type of line cards and shelves having any suitable configurations.

The line cards 202 in this embodiment are configured to operate at a data center when they are fully installed within the shelf 200. However, as with the previous embodiments, the line cards 202 may be prepared for shipping by inserting the line cards 202 only partially within the shelf 200 such that connectors on the line cards 202 are not seated in corresponding connectors of the shelf 200. Therefore, during the shipping process, the partial insertion keeps the connector elements apart from each other to prevent unnecessary wear that may be caused by vibrations and other forces during transit.

The shelf 200 may include rails 204 that are used for guiding the edges of the line cards 202 through the shelf 200 and aligning the corresponding connectors for proper engagement. Also, the line cards 202 include sockets 206 which may include pluggable modules already partially inserted therein.

Figure 38:
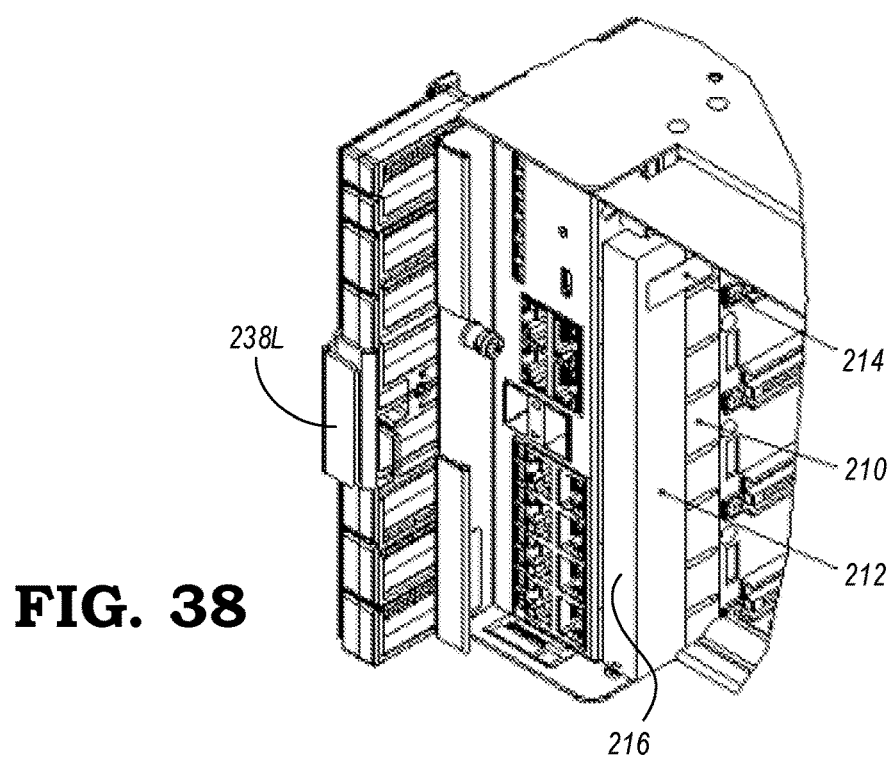
FIG. 38 is a diagram illustrating a close-up isometric view of the protection elements shown in FIG. 37, according to various embodiments.

FIG. 38 shows a close-up view of the circled portion of the shelf 200 shown in FIG. 37. The protection elements in this embodiment may include a card removal element 210, which may assist with sliding the line cards 202 back after shipment. The card removal element 210 may be secured to the sides of the shelf 200 using any suitable fastening elements. The protection elements may also include shipping components 212, which may include, for example, various packaging pieces (e.g., foam, foam rubber, rubber, soft plastic, etc.). In particular, the shipping components 212 may be formed and arranged to provide a front-facing surface 216. Also, the protection elements may include packaging tape 214 for holding the shipping components 212 to the card removal element 210.

Figure 39:
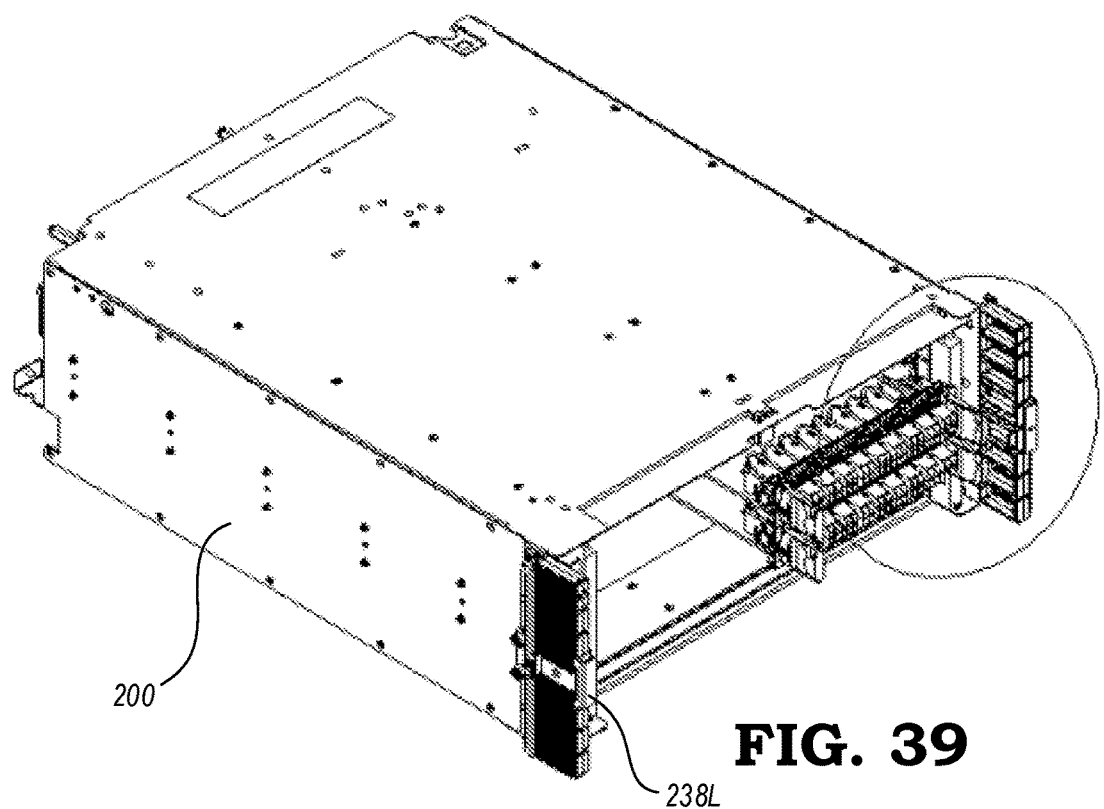
FIG. 39 is a diagram illustrating an isometric view of a shelf with protection elements installed and line cards pushed into contact with the protection elements, according to various embodiments.
Figure 40:
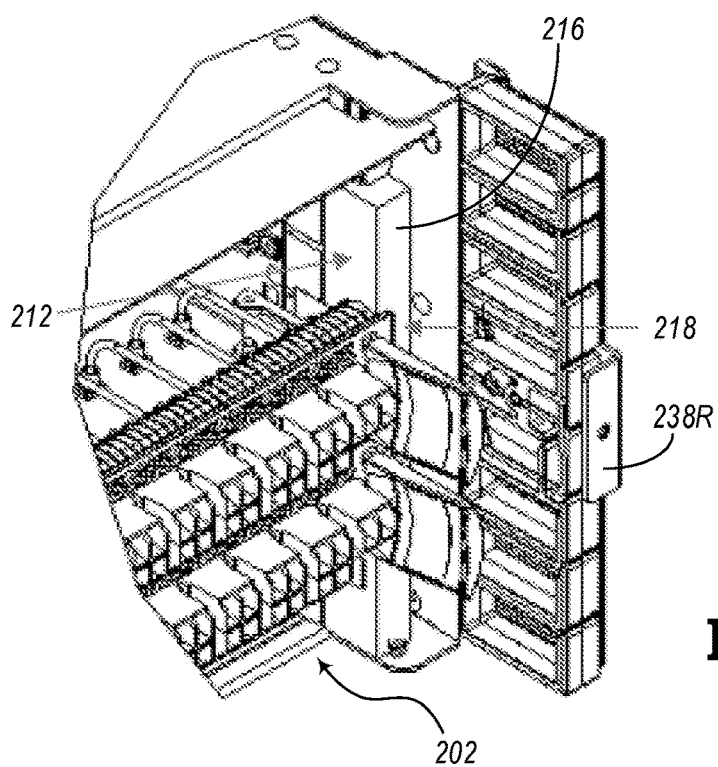
FIG. 40 is a diagram illustrating a close-up isometric view of the shelf shown in FIG. 39 with the line cards pushed into contact with the protection elements, according to various embodiments.

FIG. 39 shows another view of the shelf 200 including protection elements installed on the right side of the shelf 200. FIG. 40 shows a close-up view of the circled portion of the shelf 200 shown in FIG. 39. Therefore, the protection elements may be installed on the left side (FIGS. 37 and 38) and on the right side (FIGS. 39 and 40). Once the protection elements (i.e., elements 210, 212, 214) are installed on the left and right sides of the shelf 200, the line cards 202 can be pushed forward (i.e., along rails 204 on both sides of the shelf 200). The line cards 202 can be slid until a rear-facing side edges 218 of the line cards 202 contact front-facing surface 216 of the shipping components 212. Thus, the shipping components 212 block the line cards 202 from being pushed fully into the shelf 200 to prevent the connectors on the backs of the line cards 202 from engaging with the corresponding connectors at the back of the shelf 200. The shipping components 212 may have a predetermined depth to prevent the line cards 202 from moving substantially the same distance toward the back of the shelf 200.

Figure 41:
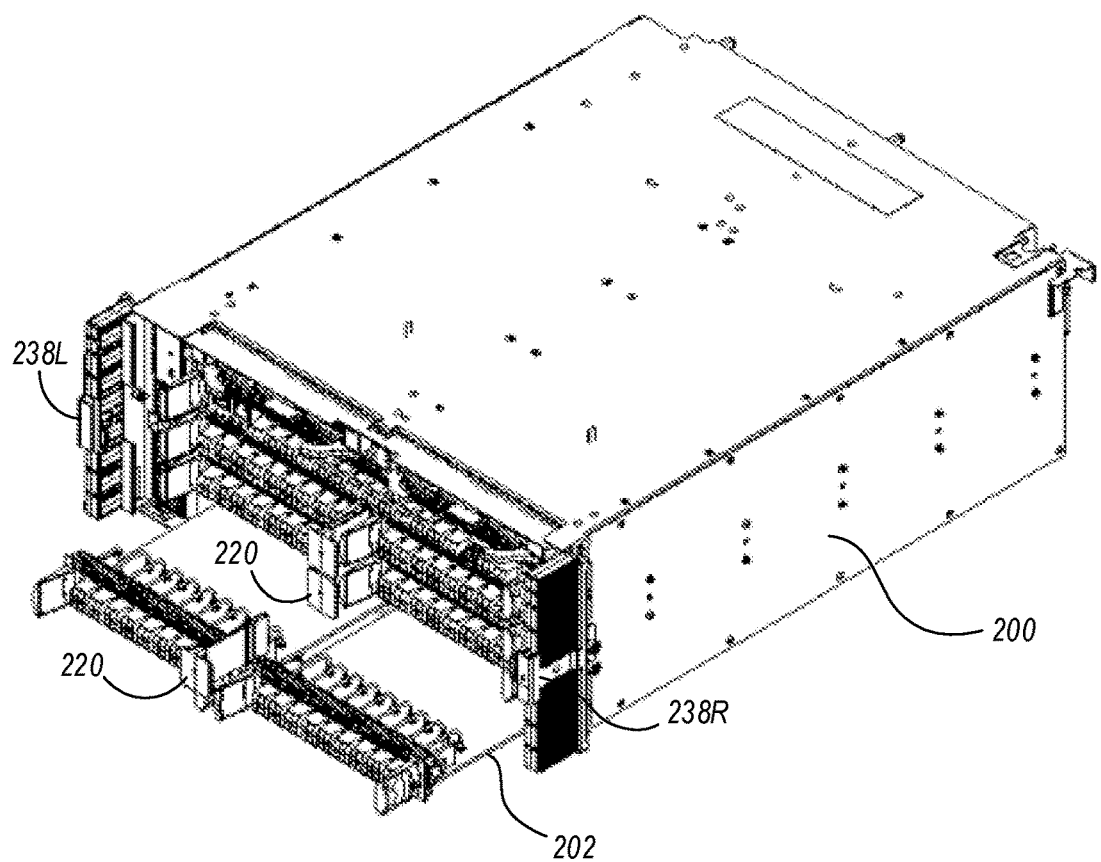
FIG. 41 is a diagram illustrating an isometric view of a shelf with protection elements installed and line card being inserted, according to various embodiments.
Figure 42:
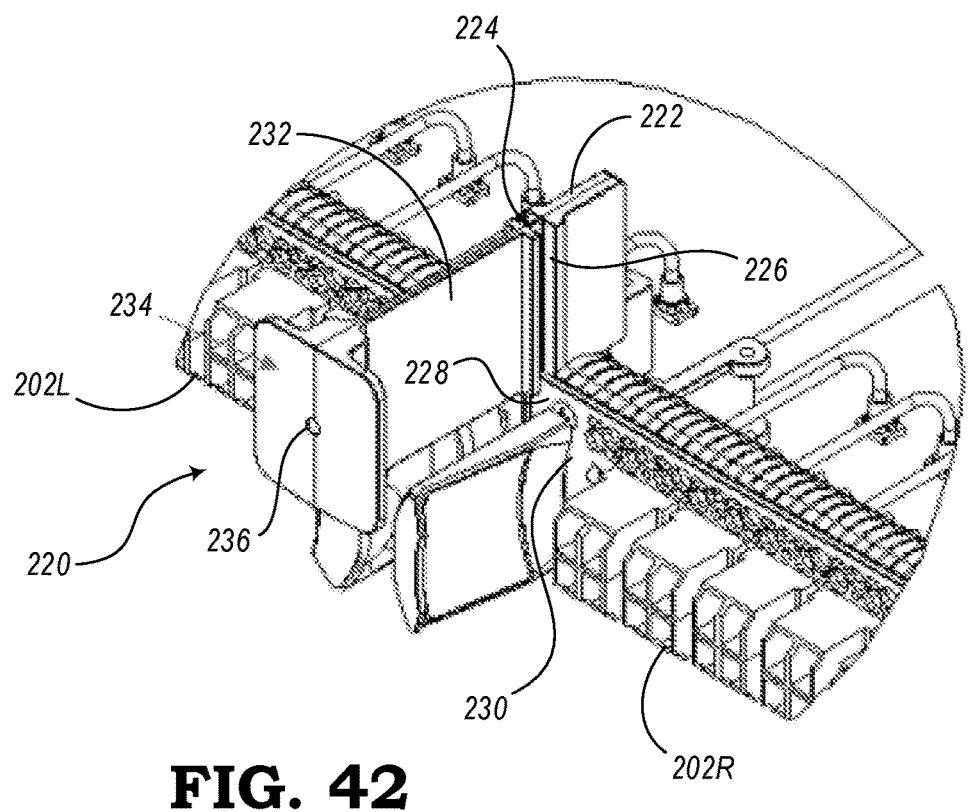
FIG. 42 is a diagram illustrating a close-up isometric view of the shelf shown in FIG. 41 with front spacers inserted, according to various embodiments.

FIG. 41 is a diagram showing the shelf 200 with an additional layer of protection elements installed. FIG. 42 shows a close-up view of a portion of the shelf 200 with the additional protection layer. The embodiment of FIGS. 41 and 42 may be applicable for shelves (e.g., shelf 200) where two line cards 202 may be installed side-by-side in a single row. Also, the shelf 200 may be configured to receive any number of rows of the side-by-side line card pairs, whereby four rows are included in the embodiment of FIGS. 37-42, which can be identified by the number of rows of rails 204 (FIG. 37).

Before each pair of side-by-side line cards are inserted, according to some embodiments, a protection element 220 may be installed. In this embodiment, the protection element 220 may include a clip 222 having a left notch 224 and a right notch 226. The clip 222 can be inserted between the two side-by-side line cards 202 such that the left notch 224 can be slid downward around a side edge (not shown) of a face plate of the left line card 202L and the right notch 226 can be slid downward around a side edge 228 of a face plate 230 of the right line card 202R.

Also, the protection element 220 includes a forward extension 232 that extends out from the clip 222 toward the front of the line cards 202L, 202R. A front spacer 234 is connected to the forward extension 232 of the protection element 220. The front spacer 234 may be used in conjunction with a bracket for protecting the line cards 202 during the shipping process. Also, the front spacer 234 may include an aperture 236 for enabling connection with the bracket.

In addition, FIGS. 37-41 show a bracket holder 238L attached to a left front portion of the shelf 200 and another bracket holder 238R attached to a right front portion of the shelf 200. The bracket holders 238L, 238R are used for holding a shipping bracket as described below with respect to FIGS. 43-46.

Figure 43:
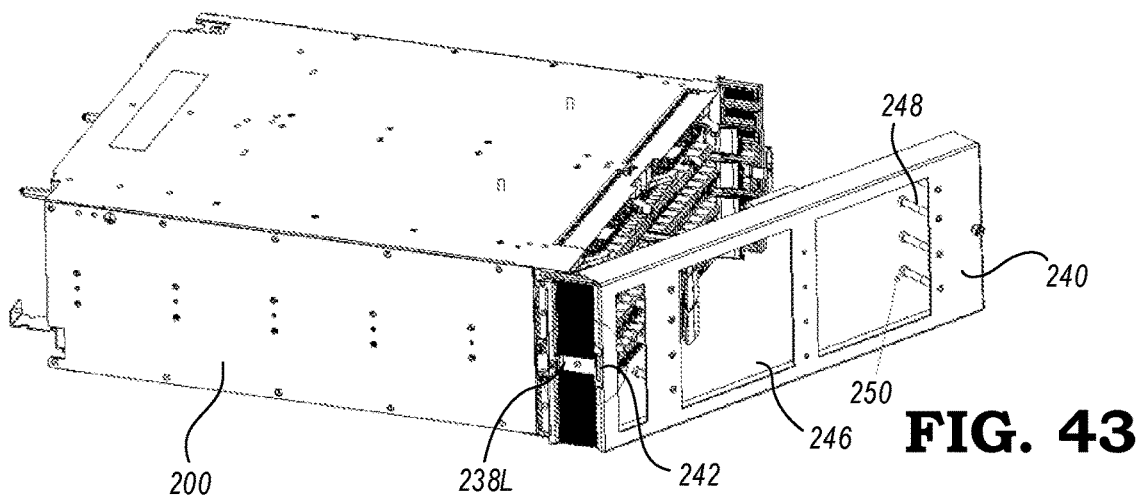
FIG. 43 is a diagram illustrating an isometric view of a shelf with a shipping bracket installed on a front of the shelf, according to various embodiments.
Figure 44:
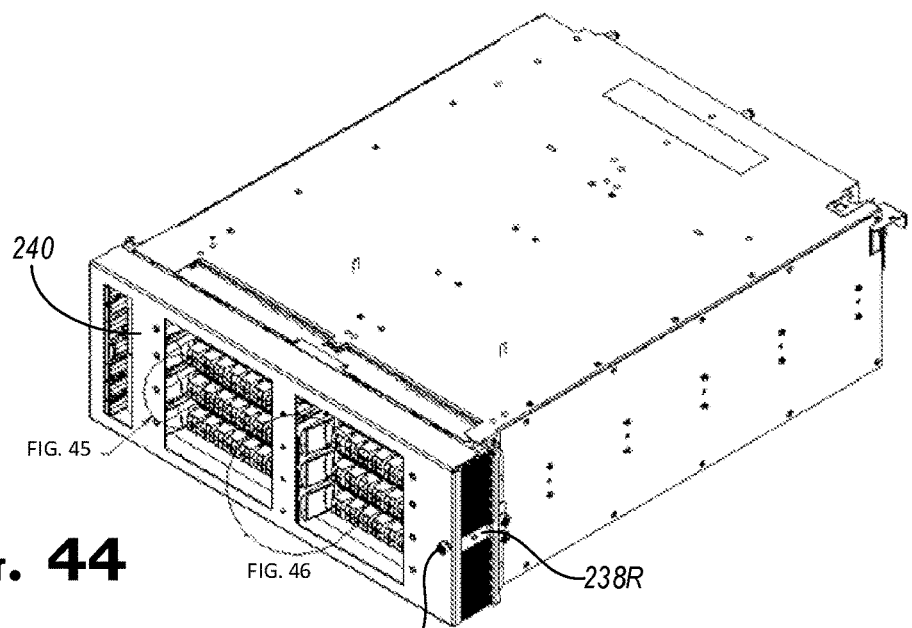
FIG. 44 is a diagram illustrating an isometric view of the shelf shown in FIG. 43 with the shipping bracket connected to the shelf for shipping, according to various embodiments.
Figure 45:
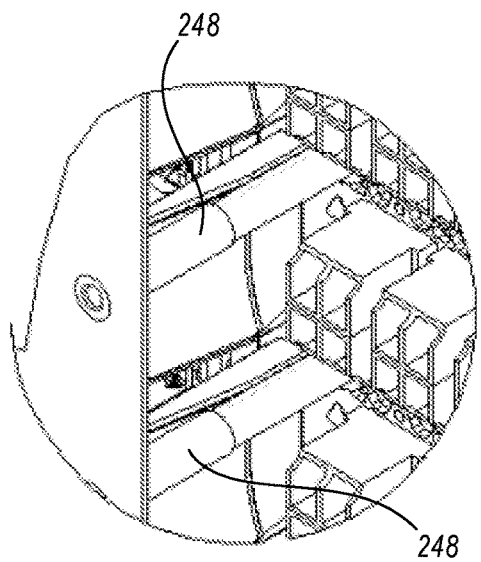
FIGS. 45 and 46 are diagrams illustrating close-up isometric views of the shelf shown in FIG. 43 showing the details of the protection elements, according to various embodiments.
Figure 46:
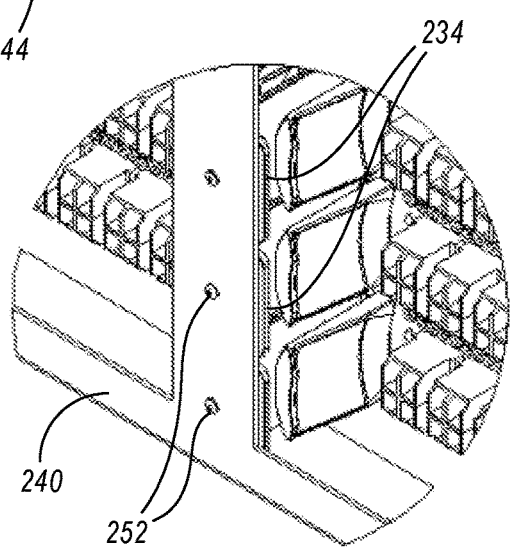

FIG. 43 shows a view of the shelf 200 with a shipping bracket 240 partially installed on a front of the shelf 200. FIG. 44 shows the shipping bracket 240 completely installed on the shelf 200. FIGS. 45 and 46 show close-up views of some of the details of shipping bracket 240 and protection element 220 shown in FIGS. 41 and 42.

The shipping bracket 240 includes a hinge 242 on a left side thereof for pivotable connection with the bracket holder 238L that is attached to the shelf 200. Also, the shipping bracket 240 includes a fastener 244 that is configured to secure the right side of the shipping bracket 240 to the bracket holder 238R that is attached to the shelf 200.

In some embodiments, the shipping bracket 240 may include windows 246 to accommodate fiber optic cables connected to pluggable modules installed in the line cards. For example, the line cards 202 may be partially installed in the shelf 200 and the shipping bracket 240 may then be installed to hold the line cards 202 in place. Then, the pluggable modules may be installed (e.g., with the protective elements described above) through the windows 246. In other embodiments, the shipping bracket 240 may be configured to allow the pluggable modules and fiber optic cables to be partially installed first, such that the line cards can be protectively secured thereafter without interfering with the installed fiber optic cables. Thus, the windows 246 may be replaced with connecting arms or other structure to allow protection and easy removal when cables are already installed.

The shipping bracket 240 may also include standoffs 248. The standoffs 248 may be connected at one end to a rear-facing side of the shipping bracket 240 and may be include rubber bumpers 250 at the other end. The rubber bumpers 250 may be pressed against front-facing portions of the line cards 202 or against the front spacers 234 of the protection elements 220 installed between (or at the ends of) the side-by-side pairs of line cards 202L, 202R. Fasteners 252 (e.g., screws) may be used to fasten the shipping bracket 240 to the front spacers 234 (e.g., via the apertures 236).

Therefore, according to some embodiments of the present disclosure, optical networking system are provided as well as protection apparatus configured to protect optical networking systems during a shipping process. In one embodiment, an optical networking system may include a line card having one or more sockets, where each of the one or more sockets includes a connector device. The optical networking system may also include one or more pluggable modules, where each pluggable module includes an interface configured to connect with the connector device of a respective socket when the pluggable module is fully seated in the respective socket. Also, the optical networking system may include a first protection element configured to be held in place near a front edge of the one or more sockets. The first protection element may be configured to allow the one or more pluggable modules to be arranged in a partially inserted position within the one or more respective sockets. Also, the first protection element may be further configured to block the one or more pluggable modules from being fully seated in the one or more sockets to thereby prevent the interface of each of the one or more pluggable modules from contacting the connector device of the respective socket.

In this embodiment, the first protection element may be configured to enable the optical networking system to be shipped without connector engagement between the interface of the one or more pluggable modules and the one or more respective connector devices. The optical networking system may further include shipping materials or shipping components configured to hold the one or more pluggable modules in the partially inserted position for sufficient physical and protective support during shipping. The first protection element may be configured to protect the interface and respective connector device during shipping by keeping the interface and respective connector device apart from each other to thereby reduce damage to the interface and respective connector device on account of vibration and other forces that may be experienced during shipping.

Furthermore, the first protection element may be removed with little displacement of the one or more pluggable modules from the partially inserted position within the one or more respective sockets. Each of the one or more pluggable modules may then be moved deeper into the respective socket to be fully seated in the respective socket when the first protection element is removed.

The first protection element of the optical networking system may include at least a top arm arranged near a top edge of the one or more sockets. A step or abutment of each of the one or more pluggable modules may be configured to contact the top arm when the one or more pluggable modules are arranged in the partially inserted position. The first protection element may include a latch for holding the first protection element in place near the front edge of the one or more sockets. The first protection element may also include a tab configured to enable a user to remove the first protection element by pulling it in a sideways direction.

In addition, the optical networking system may further include one or more light emitting devices arranged at the front edge of the one or more sockets. Also, a light pipe may be embedded in each of the one or more pluggable modules, where each light pipe includes a rear-facing entry and a forward-facing exit. Each of the one or more sockets of the circuit pack may be configured to detect when the interface of a respective pluggable module is fully engaged with the connector device of the respective socket. Each socket may then cause the respective light emitting device to create a light that is emitted through the rear-facing entry of the light pipe of the respective pluggable module and out the forward-facing exit for indicating to a user that the pluggable module is fully seated in the respective socket.

According to additional embodiments, the optical networking system may further include a shelf including one or more slots configured to receive one or more line cards. Each line card may include a rear connector configured for connection with a connection device at a back portion of a corresponding slot when the respective line card is fully seated in the respective slot. A second protection element may be configured to be held in place near a front edge of the one or more slots, where the second protection element is configured to allow the one or more line cards to be arranged in a partially inserted position within the one or more respective slots. The second protection element may further be configured to block the one or more line cards from being fully seated in the one or more slots to thereby prevent the rear connector of each of the one or more line cards from contacting the connection device of the respective slot.

Figure 47:
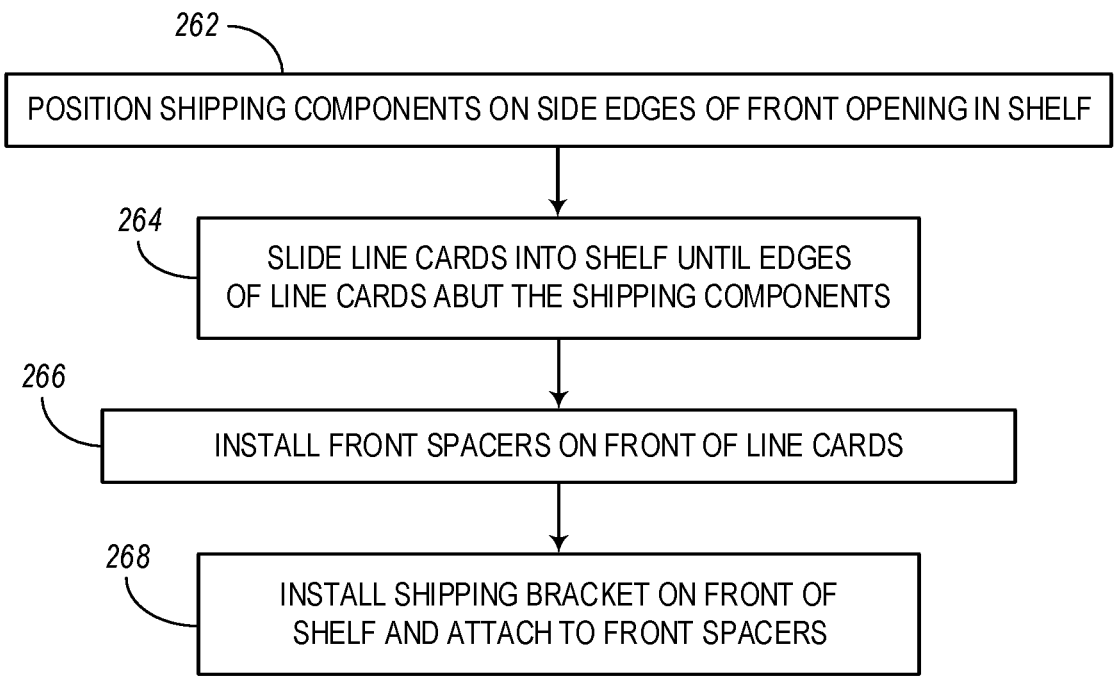
FIG. 47 is a flow diagram illustrating a process to be performed at a factory for preparing networking equipment for shipping, according to various embodiments.

FIG. 47 is a flow diagram illustrating an embodiment of a process 260 to be performed at a factory or warehouse for preparing networking equipment for shipping. This process may be performed in coordination with the process 170 of FIG. 35 that involves protectively installing pluggable modules partially into corresponding sockets. The process 260 may be performed before, after, or at about the same time as the execution of process 170, depending on the various embodiments of protection elements being used and the configurations thereof.

The process 260 includes a step of positioning shipping components on the side edges of a front opening in a shelf, as indicated in block 262. The process 260 also includes sliding line cards into the shelf until the edges of the line cards abut the shipping components, as indicated in block 264. The process 260 also includes installing one or more front spacers on the front of the line cards, as indicated in block 266. In some embodiments, a pair of line cards may be placed side-by-side in the shelf, whereby installing the front spacers may include installing some of these front spacers between each pair. Also, the process 260 includes installing a shipping bracket on the front of the shelf, which may further include attaching the shipping bracket to the front spacers (step 268).

Figure 48:
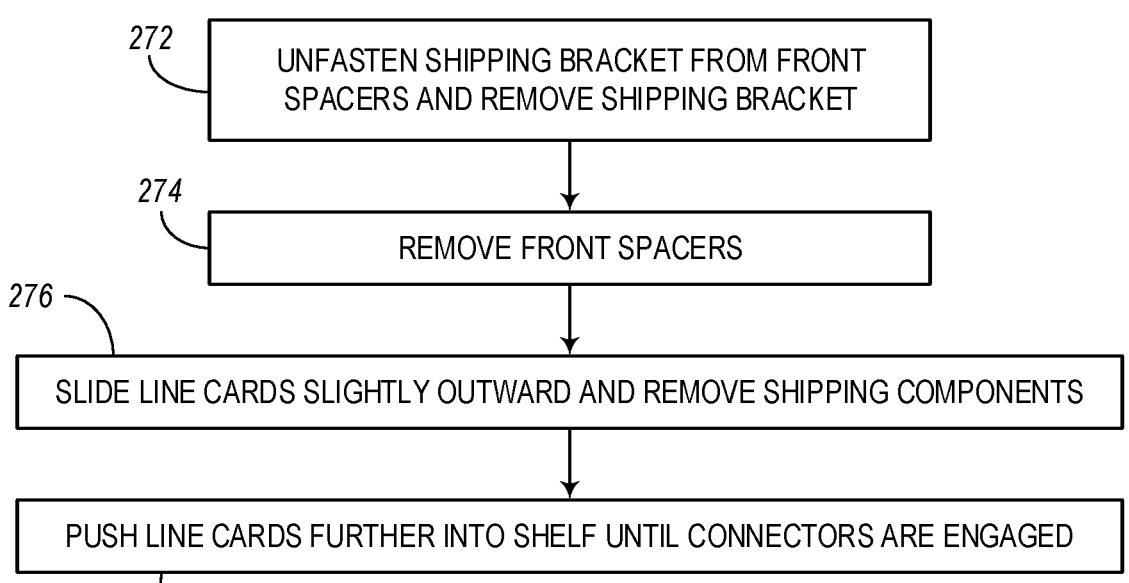
FIG. 48 is a flow diagram illustrating a process to be performed at a data center for setting up the networking equipment for operation, according to various embodiments.

FIG. 48 is a flow diagram illustrating an embodiment of a process 270 that may be performed at a data center or other site where the networking equipment is shipped. This process may be performed in coordination with the process 180 of FIG. 36 that involves setting up the pluggable modules in their corresponding sockets. The process 270 may be performed before, after, or at about the same time as the execution of process 180, depending on the various embodiments of protection elements being used and the configurations thereof.

The process 270 involves setting up the networking equipment for operation at the site. In this embodiment, the process 270 includes unfastening the shipping bracket from the front spacers and removing the shipping bracket, as indicated in block 272. Once the shipping bracket is removed, the process 270 may include removing the front spacers from the line cards, as indicated in block 274. Then, the process 270 may include sliding the line cards slightly outward from the shelf, as indicated in block 276. The line cards may be slid out in side-by-side pairs, one at a time, or all at once, depending on various features of the shipping components and arrangement of line cards in the shelf. Block 276 also includes the step of removing the shipping components when the line cards move outward such that they are no longer pressed up against them. Also, the process 270 includes the step of pushing the line cards further into the shelf until the corresponding connectors fully engaged.

Therefore, according to some embodiments, a method may be executed for preparing an optical networking system for shipping. For example, the method may include the steps of fastening a shipping element (or first protection element) to a face plate of a line card and inserting a pluggable module into a socket of the circuit pack supported on the line card until an abutment (e.g., a step or beveled edge) of the pluggable module contacts the first protection element.

This method may further include the step of attaching a fiber optic cable to an optical interface of the pluggable module. Also, the method may include the steps of positioning shipping components on side edges of a front opening of a shelf and sliding the line card into the shelf until edges of the line card about the shipping components. The method may further include installing a front spacer on a face side of the line card, installing a shipping bracket on a front portion of the shelf, and attaching the shipping bracket to the front spacer.

Therefore, it may be recognized that the processes 180, 270 greatly simplify the installation process on site. Also, it may be recognized that with the pre-cabling and pre-installation processes by an expert at a factory (or warehouse), the operators on site may be able to easily remove the protection elements and shipping components and complete the full installation of the various connection plugs that are already arranged with the correct matching components.

Thus, the spacers or protection elements are used for spacing the various matching components apart to protect the respective connectors thereof. A spacer can be used for a group of pluggable modules (e.g., QSFP-DDs). In some embodiments, the spacer or protection elements for the pluggable modules may include a comb structure with outside tines and a middle tine that is inserted between two rows of sockets. Therefore, this middle tine may be used to block movement of the pluggable modules by creating an abutment for the bottom step (e.g., second step 27) or beveled edge of the pluggable module 10.

The protection elements may be screw onto the chassis or shelf that supports the circuit packs or plug receptacle cages according to some embodiments. Other embodiments may include simply sliding the protection elements into place or sliding them out to remove them after shipping. Some embodiments may include latching mechanisms on the protection elements so that they do not fall off during shipping. Again, the protection elements can be easily removable by a user without unplugging the pluggable modules (e.g., QSFP-DDs). The protection elements may be configured to support and protect any type of pluggable modules, pluggables, or other types of plugs, such as Small Form-factor Pluggable (SFP) devices, C (centum) Form-factor Pluggable (CFP) devices, Octal Small Form-factor Pluggable (OSFP) devices, or others.

Once the protection elements are used to enable plugs to be partially installed in their respective sockets, the present disclosure may further allow the use of additional shipping materials or components. For example, the shipper may install tie wraps to secure bundles of cable together and to secure these bundles to the rack. The bundle stiffness may prevent the pluggable modules from sliding out during shipping. Also, the protection elements may include features configured to hold onto the pluggable modules so that they do not slide off during shipping and so that the pluggable modules can be held in place within their sockets. For example, the protection elements may include features that re-create a latching mechanism that a cage (e.g., edge of socket or face plate) normally implements. As such, the pluggable module may latch onto the protection elements instead of the cage. However, in some uses, the DAC cable stiffness and bundling may be sufficient to keep the pluggable modules from falling out.

Therefore, the embodiments of the present disclosure provide advantages over conventional shipping systems. The present embodiments provide an advantage of solving complicated fibering issues and simplify the set-up process on site. Also, by partially connecting all of the parts of an entire network device (or a portion of the networking equipment) and shipping as one piece, the shipping strategies discussed herein may use much less shipping and packaging supplies, boxes, etc., and may thereby be more environmentally friendly.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An optical networking system comprising:
    a card having one or more sockets, each of the one or more sockets including a connector device;
    one or more pluggable modules, each pluggable module including an interface configured to connect with the connector device of a respective socket when the pluggable module is fully seated in the respective socket;
    a first protection element configured to be held in place near a front edge of the one or more sockets; and
    shipping components configured to hold the one or more pluggable modules in the partially inserted position for physical and protective support during shipping, wherein the first protection element is configured to protect the interface and respective connector device during shipping by keeping the interface and respective connector device apart to thereby reduce damage to the interface and respective connector device due to vibration and other forces during shipping;
    wherein the first protection element is configured to allow the one or more pluggable modules to be arranged in a partially inserted position within the one or more respective sockets; and
    wherein the first protection element is further configured to block the one or more pluggable modules from being fully seated in the one or more sockets to thereby prevent the interface of each of the one or more pluggable modules from contacting the connector device of the respective socket.

2. The optical networking system of claim 1, wherein the first protection element enables the optical networking system to be shipped without connector engagement between the interface of the one or more pluggable modules and the one or more respective connector devices.

3. The optical networking system of claim 1, wherein the first protection element is configured to be removed with little displacement of the one or more pluggable modules from the partially inserted position within the one or more respective sockets, allowing each of the one or more pluggable modules to be moved deeper into the respective socket to be fully seated in the respective socket when the first protection element is removed.

4. The optical networking system of claim 1, wherein the first protection element includes at least a top arm arranged near a top edge of the one or more sockets, and wherein a step or abutment of each of the one or more pluggable modules is configured to contact the top arm when the one or more pluggable modules are arranged in the partially inserted position.

5. The optical networking system of claim 1, wherein the first protection element includes a latch for holding the first protection element in place near the front edge of the one or more sockets.

6. The optical networking system of claim 1, wherein the first protection element includes a tab configured to enable removal of the first protection element in a sideways direction.

7. The optical networking system of claim 1, further comprising:
    one or more light emitting devices arranged at the front edge of the one or more sockets; and
    a light pipe embedded in each of the one or more pluggable modules, each light pipe including a rear-facing entry and a forward-facing exit;
    wherein each of the one or more sockets of the circuit pack is configured to detect when the interface of a respective pluggable module is fully engaged with the connector device of the respective socket and to cause the respective light emitting device to create a light that is emitted through the rear-facing entry of the light pipe of the respective pluggable module and out the forward-facing exit for indicating to a user that the pluggable module is fully seated in the respective socket.

8. The optical networking system of claim 1, further comprising:
    a shelf including one or more slots configured to receive one or more cards, each card including a rear connector configured for connection with a connection device at a back portion of a corresponding slot when the respective card is fully seated in the respective slot; and
    a second protection element configured to be held in place near a front edge of the one or more slots;
    wherein the second protection element is configured to allow the one or more cards to be arranged in a partially inserted position within the one or more respective slots; and
    wherein the second protection element is further configured to block the one or more cards from being fully seated in the one or more slots to thereby prevent the rear connector of each of the one or more cards from contacting the connection device of the respective slot.

9. An optical networking system comprising:
    a card having one or more sockets, each of the one or more sockets including a connector device;
    one or more pluggable modules, each pluggable module including an interface configured to connect with the connector device of a respective socket when the pluggable module is fully seated in the respective socket; and
    a first protection element configured to be held in place near a front edge of the one or more sockets, wherein the first protection element includes one or more of i) a latch for holding the first protection element in place near the front edge of the one or more sockets, and ii) a tab configured to enable removal of the first protection element in a sideways direction;
    wherein the first protection element is configured to allow the one or more pluggable modules to be arranged in a partially inserted position within the one or more respective sockets; and
    wherein the first protection element is further configured to block the one or more pluggable modules from being fully seated in the one or more sockets to thereby prevent the interface of each of the one or more pluggable modules from contacting the connector device of the respective socket.

10. The optical networking system of claim 9, wherein the first protection element is configured to be removed with little displacement of the one or more pluggable modules from the partially inserted position within the one or more respective sockets, allowing each of the one or more pluggable modules to be moved deeper into the respective socket to be fully seated in the respective socket when the first protection element is removed.

11. The optical networking system of claim 9, wherein the first protection element includes at least a top arm arranged near a top edge of the one or more sockets, and wherein a step or abutment of each of the one or more pluggable modules is configured to contact the top arm when the one or more pluggable modules are arranged in the partially inserted position.

12. The optical networking system of claim 9, further comprising:
one or more light emitting devices arranged at the front edge of the one or more sockets; and
a light pipe embedded in each of the one or more pluggable modules, each light pipe including a rear-facing entry and a forward-facing exit;
wherein each of the one or more sockets of the circuit pack is configured to detect when the interface of a respective pluggable module is fully engaged with the connector device of the respective socket and to cause the respective light emitting device to create a light that is emitted through the rear-facing entry of the light pipe of the respective pluggable module and out the forward-facing exit for indicating to a user that the pluggable module is fully seated in the respective socket.

13. The optical networking system of claim 9, further comprising:
a shelf including one or more slots configured to receive one or more cards, each card including a rear connector configured for connection with a connection device at a back portion of a corresponding slot when the respective card is fully seated in the respective slot; and
a second protection element configured to be held in place near a front edge of the one or more slots;
wherein the second protection element is configured to allow the one or more cards to be arranged in a partially inserted position within the one or more respective slots; and
wherein the second protection element is further configured to block the one or more cards from being fully seated in the one or more slots to thereby prevent the rear connector of each of the one or more cards from contacting the connection device of the respective slot.

14. An optical networking system comprising:
a card having one or more sockets, each of the one or more sockets including a connector device;
one or more pluggable modules, each pluggable module including an interface configured to connect with the connector device of a respective socket when the pluggable module is fully seated in the respective socket; and
a first protection element configured to be held in place near a front edge of the one or more sockets, wherein the first protection element includes at least a top arm arranged near a top edge of the one or more sockets, and wherein a step or abutment of each of the one or more pluggable modules is configured to contact the top arm when the one or more pluggable modules are arranged in the partially inserted position;
wherein the first protection element is configured to allow the one or more pluggable modules to be arranged in a partially inserted position within the one or more respective sockets; and
wherein the first protection element is further configured to block the one or more pluggable modules from being fully seated in the one or more sockets to thereby prevent the interface of each of the one or more pluggable modules from contacting the connector device of the respective socket.

15. The optical networking system of claim 14, wherein the first protection element is configured to be removed with little displacement of the one or more pluggable modules from the partially inserted position within the one or more respective sockets, allowing each of the one or more pluggable modules to be moved deeper into the respective socket to be fully seated in the respective socket when the first protection element is removed.

16. The optical networking system of claim 14, further comprising:
one or more light emitting devices arranged at the front edge of the one or more sockets; and
a light pipe embedded in each of the one or more pluggable modules, each light pipe including a rear-facing entry and a forward-facing exit;
wherein each of the one or more sockets of the circuit pack is configured to detect when the interface of a respective pluggable module is fully engaged with the connector device of the respective socket and to cause the respective light emitting device to create a light that is emitted through the rear-facing entry of the light pipe of the respective pluggable module and out the forward-facing exit for indicating to a user that the pluggable module is fully seated in the respective socket.

17. The optical networking system of claim 14, further comprising:
a shelf including one or more slots configured to receive one or more cards, each card including a rear connector configured for connection with a connection device at a back portion of a corresponding slot when the respective card is fully seated in the respective slot; and
a second protection element configured to be held in place near a front edge of the one or more slots;
wherein the second protection element is configured to allow the one or more cards to be arranged in a partially inserted position within the one or more respective slots; and
wherein the second protection element is further configured to block the one or more cards from being fully seated in the one or more slots to thereby prevent the rear connector of each of the one or more cards from contacting the connection device of the respective slot.

\* \* \* \* \*